US011684213B2

(12) United States Patent
Majchrzak et al.

(10) Patent No.: US 11,684,213 B2
(45) Date of Patent: Jun. 27, 2023

(54) VENTLESS HOOD FOR COOKING UNIT

(71) Applicant: Hatco Corporation, Milwaukee, WI (US)

(72) Inventors: Michael Majchrzak, Milwaukee, WI (US); Jim Virgin, Milwaukee, WI (US); Kevin Veeser, Milwaukee, WI (US); William Novotny, Milwaukee, WI (US); Matthew Thomas, Milwaukee, WI (US); Nicholas Bassill, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 699 days.

(21) Appl. No.: 16/782,127

(22) Filed: Feb. 5, 2020

(65) Prior Publication Data

US 2020/0245815 A1     Aug. 6, 2020

Related U.S. Application Data

(60) Provisional application No. 62/802,094, filed on Feb. 6, 2019.

(51) Int. Cl.
*A47J 39/00*        (2006.01)
*A47J 36/24*        (2006.01)
(Continued)

(52) U.S. Cl.
CPC ......... *A47J 39/003* (2013.01); *A47J 36/2483* (2013.01); *A47J 36/40* (2013.01); *A47J 36/42* (2013.01)

(58) Field of Classification Search
CPC ...... A47J 39/003; A47J 36/2483; A47J 36/38; A47J 37/047; A47J 36/2488; A47J 36/40;
(Continued)

(56) References Cited

U.S. PATENT DOCUMENTS 5,780,815 A * 7/1998 Mestnik ................ A47J 37/047
219/400
7,220,946 B2   5/2007 Majchrzak et al.
(Continued)

FOREIGN PATENT DOCUMENTS

CN       106051858 A * 10/2016

OTHER PUBLICATIONS

English translation of CN-106051858-A (Year: 2016).*

*Primary Examiner* — Chris Q Liu
(74) *Attorney, Agent, or Firm* — Foley & Lardner LLP

(57) ABSTRACT

A cooking unit includes a cooktop, a hood assembly, a duct assembly, and a fan. The cooktop defines a slot at least partially extending along a peripheral edge of the cooktop. The hood assembly includes a hood support extending upward from the cooktop and a hood coupled to the hood support. The hood support defines a conduit. The hood defines an intake and a hood chamber connecting the intake to the conduit of the hood support. The duct assembly includes ducting extending beneath the cooktop. The ducting connects the conduit to the slot. The fan is positioned to drive air into the intake, through the hood chamber, through the conduit, through the ducting, and out of the slot. At least a portion of the air exiting the slot returns to the intake such that an air curtain is generated between the slot and the intake.

11 Claims, 20 Drawing Sheets

(51) Int. Cl.
*A47J 36/42* (2006.01)
*A47J 36/40* (2006.01)

(58) Field of Classification Search
CPC ...... A47J 36/42; A47J 37/044; A47J 37/0623;
A47J 37/0629; A47J 37/0641; A47J
37/1271; A47J 39/00; F24C 15/2042;
F24C 15/2028; F24C 15/20; F24C
15/2085; F24C 15/322; F24C 15/2014;
F24C 15/2035; F24C 15/2092; F24C
15/02; F24C 15/205; F24C 15/2071;
F24C 7/00; F24C 7/065; F24C 13/00;
F24C 15/2064; F24C 15/2078; F24C
15/34; F24C 7/06
USPC ......... 99/474, 386, 468, 479, 330, 331, 423,
99/476, 477; 219/400, 214, 385, 388,
219/401, 543, 620, 622, 623, 677, 757,
219/218, 220, 409, 410, 411, 451.1, 530,
219/552, 553
See application file for complete search history.

(56) References Cited

U.S. PATENT DOCUMENTS

| | | | |
|---|---|---|---|
| 8,134,101 B2 | 3/2012 | Majchrzak | |
| 8,522,770 B2* | 9/2013 | Colburn | F24C 15/2028 |
| | | | 126/299 R |
| 8,872,077 B2* | 10/2014 | Gagas | F24C 15/2042 |
| | | | 219/622 |
| 9,874,356 B2* | 1/2018 | Jeong | F24C 15/2028 |
| 2005/0211109 A1 | 9/2005 | Majchrzak et al. | |
| 2011/0005409 A1 | 1/2011 | Majchrzak | |
| 2017/0325629 A1* | 11/2017 | Scanlon | F21V 29/83 |
| 2018/0103679 A1* | 4/2018 | Leo | A01K 67/033 |
| 2019/0032925 A1* | 1/2019 | Gargiulo | F24C 15/2071 |

* cited by examiner

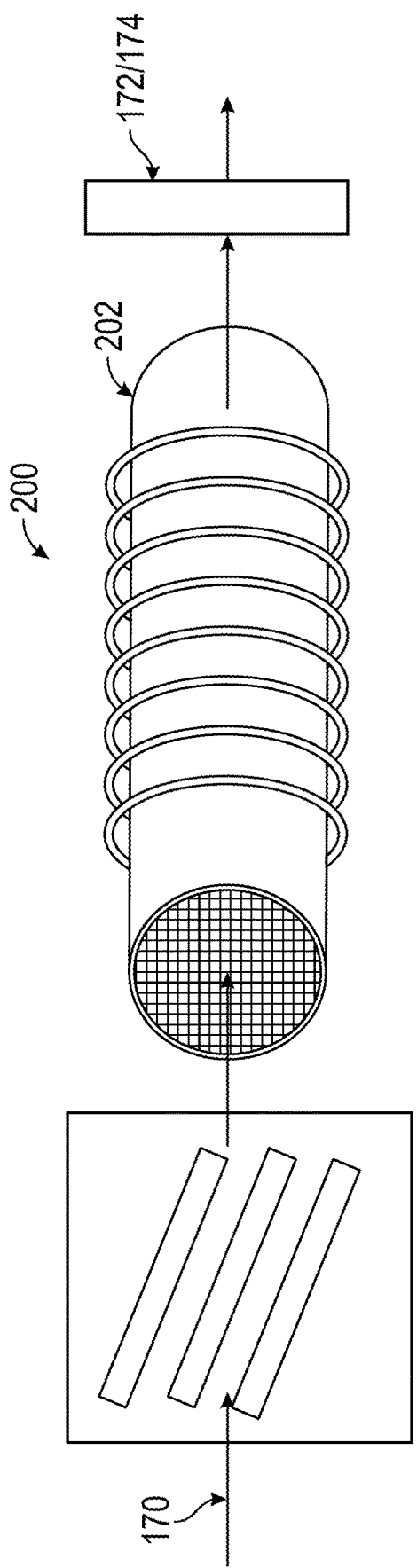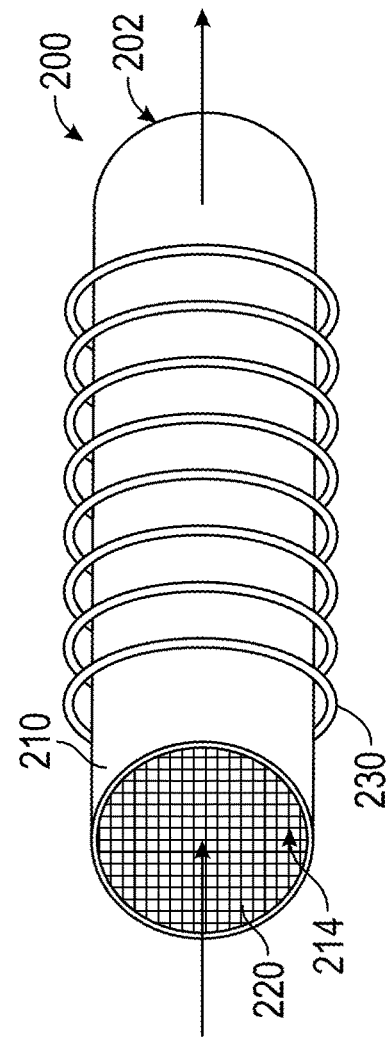
FIG. 8
FIG. 9

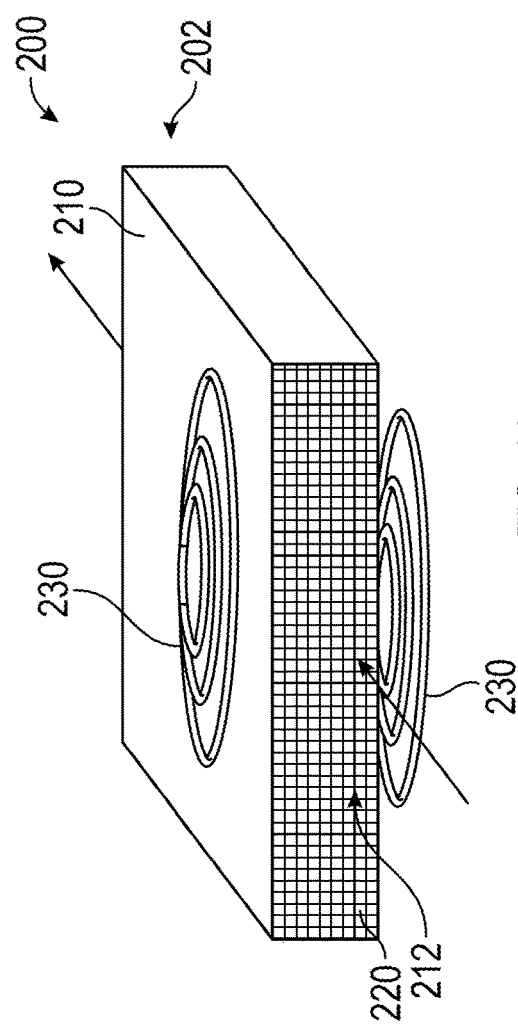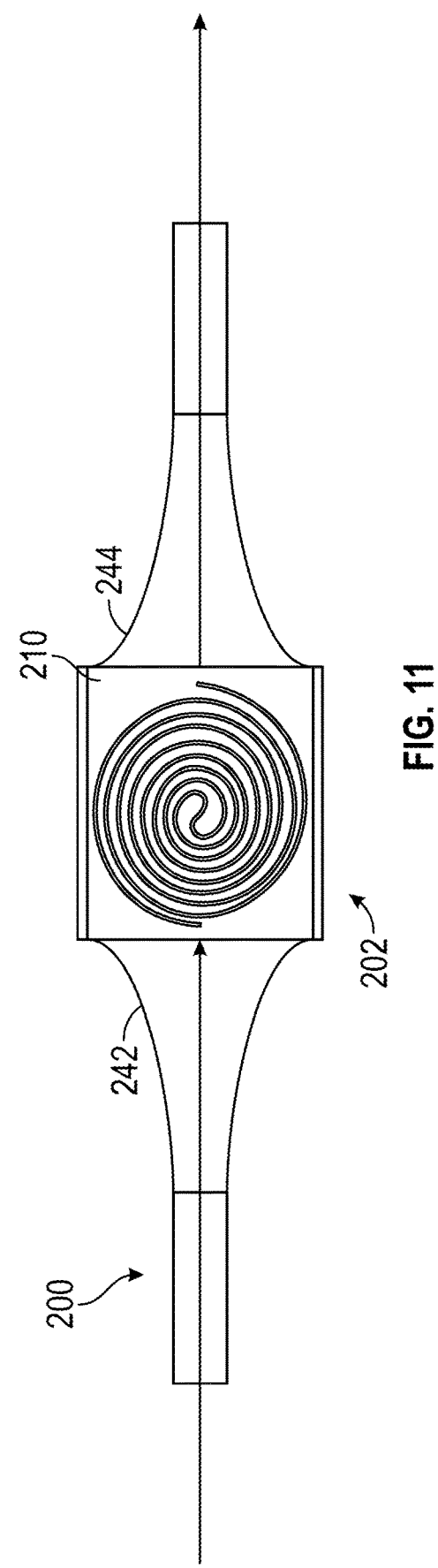

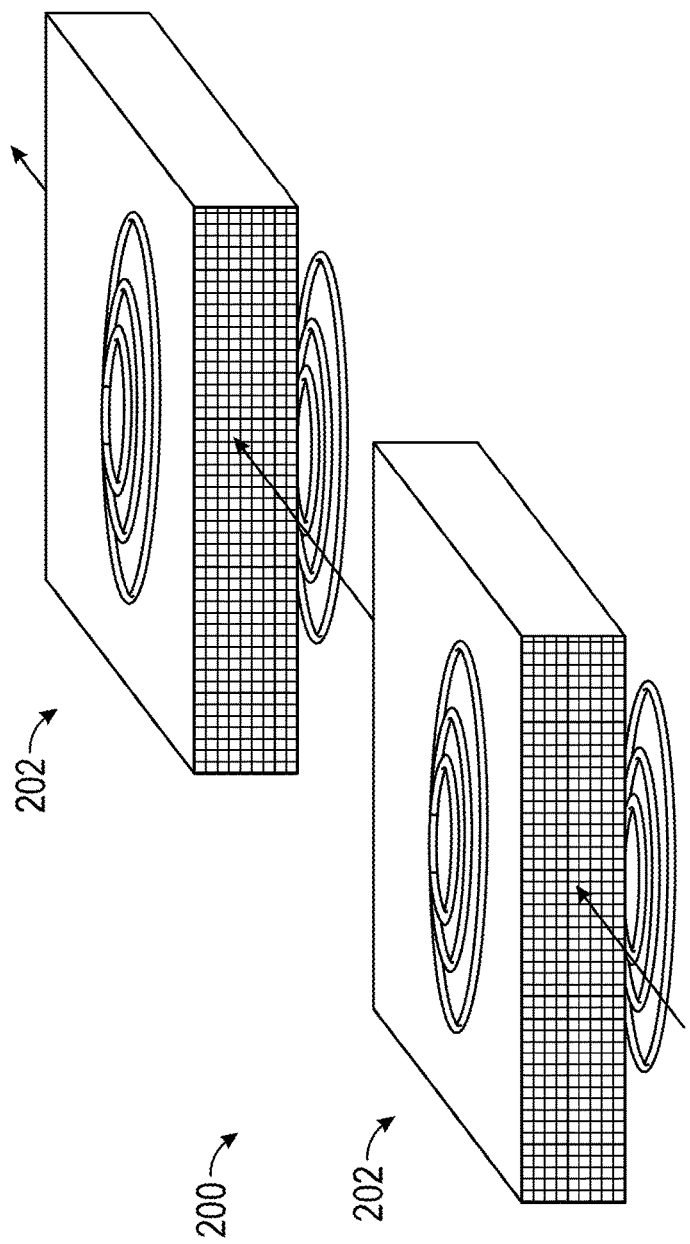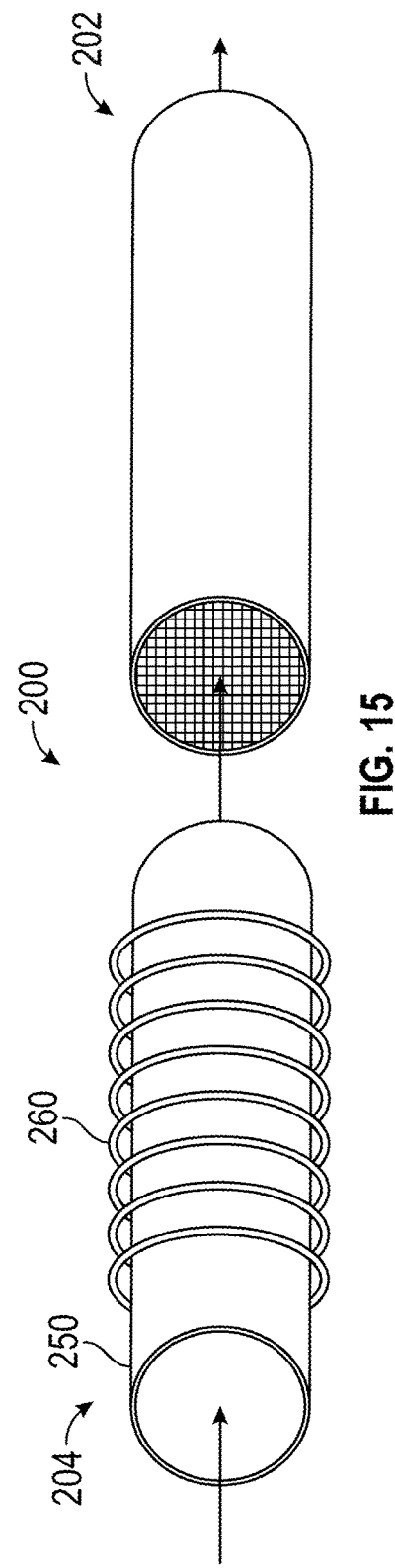
FIG. 14
FIG. 15

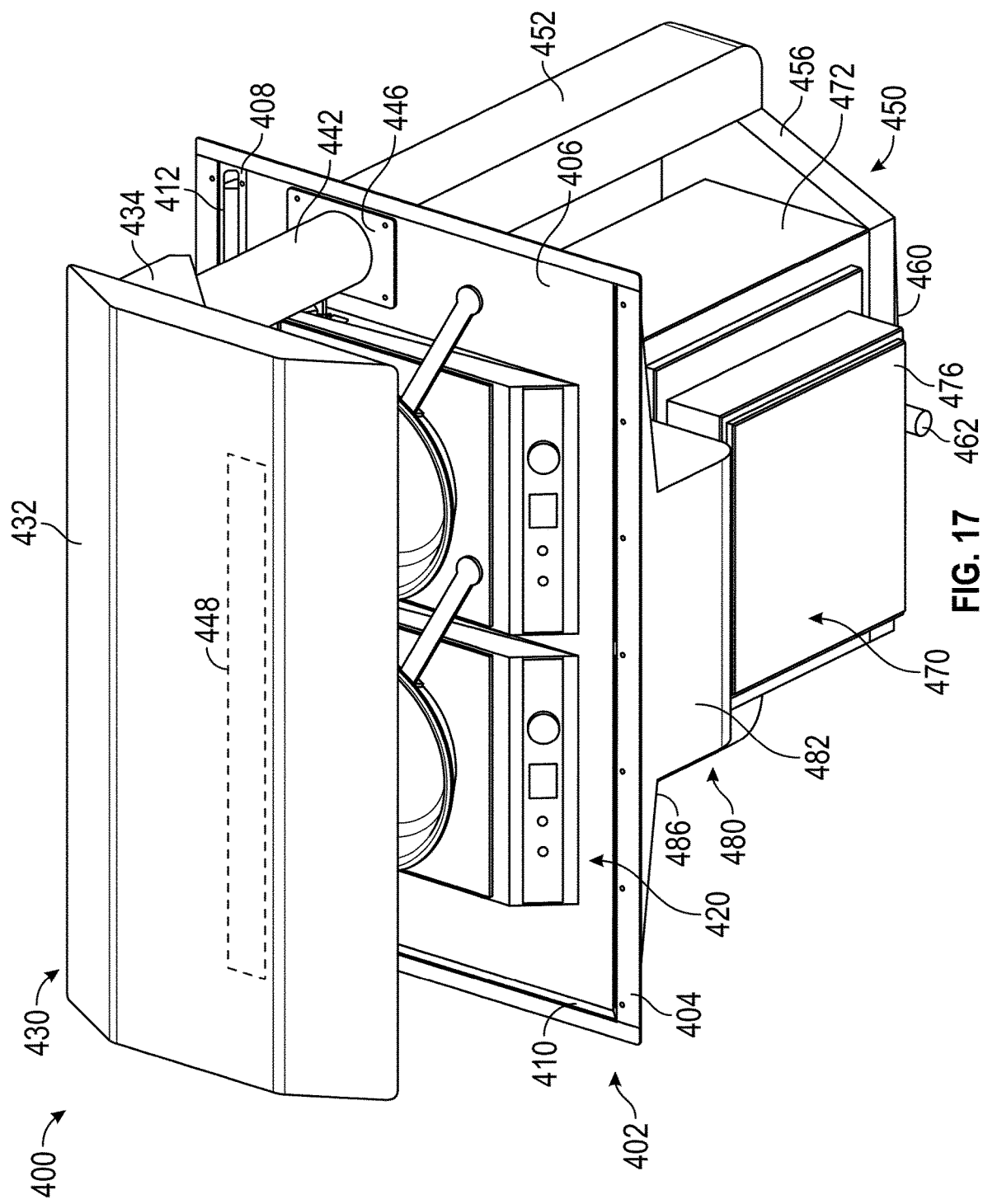

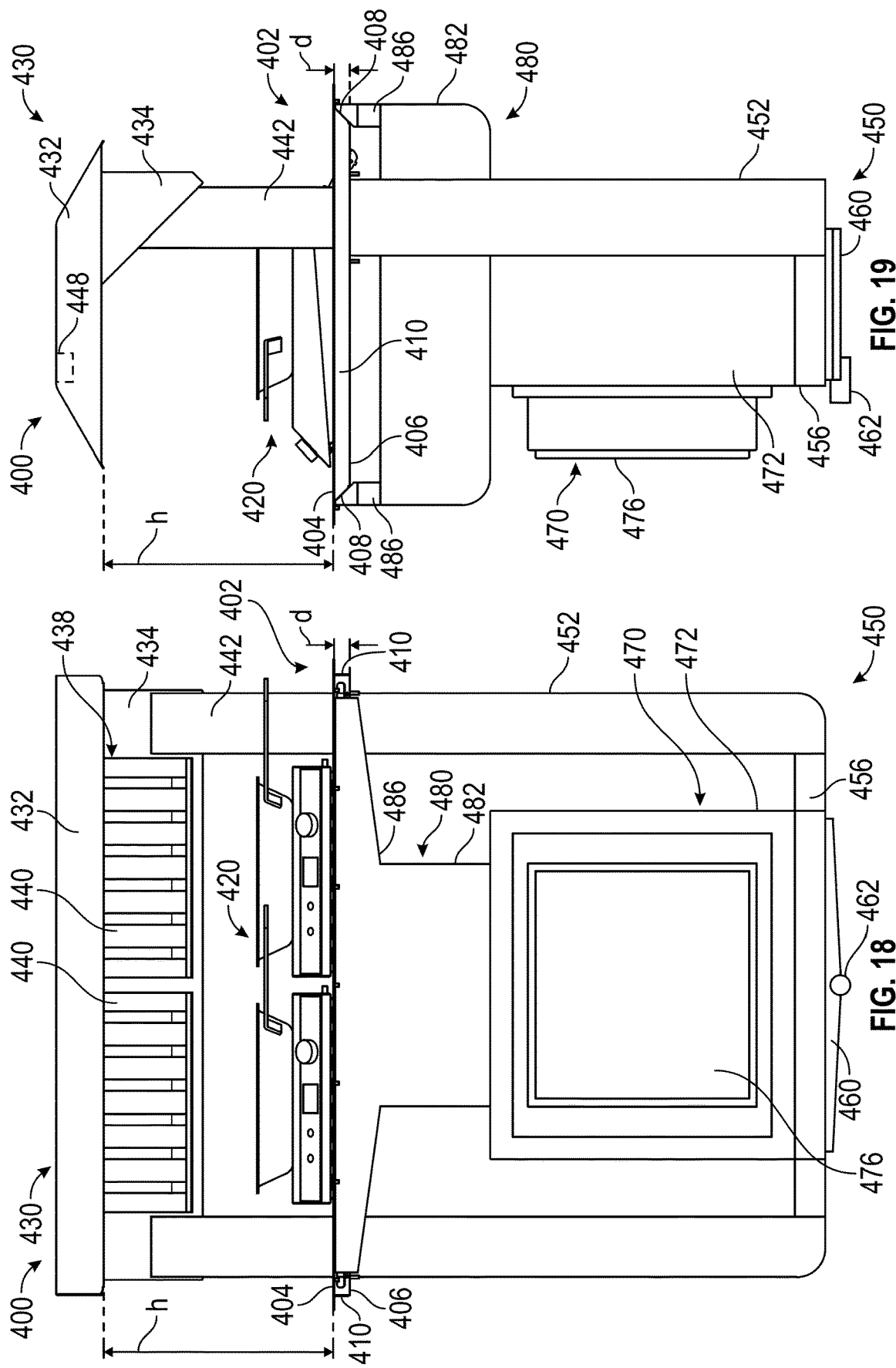

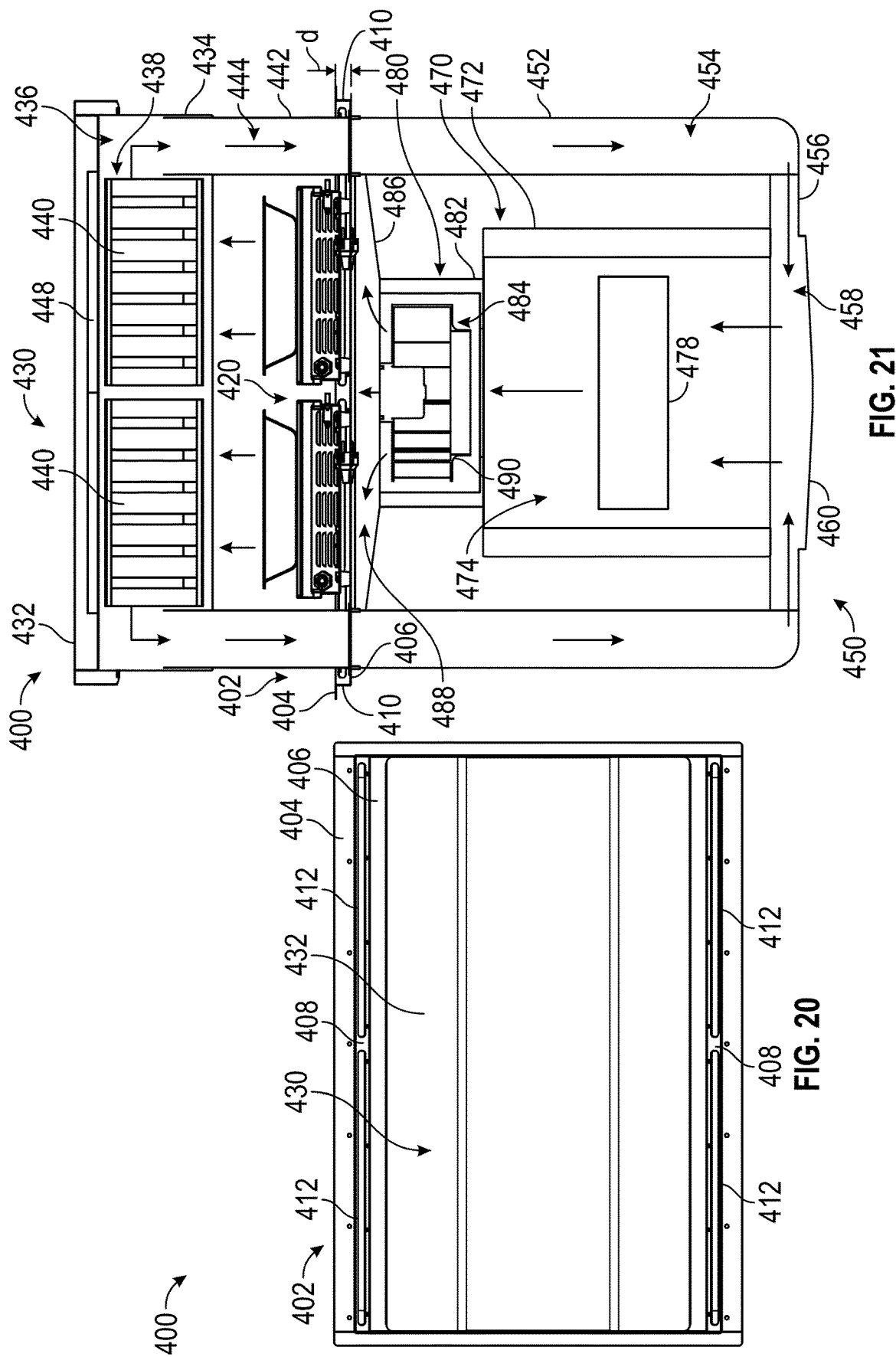

VENTLESS HOOD FOR COOKING UNIT

CROSS-REFERENCE TO RELATED PATENT APPLICATION

This application claims the benefit of U.S. Patent Application No. 62/802,094, filed Feb. 6, 2019, which is incorporated herein by reference in its entirety.

BACKGROUND

Hoods for cooking units draw in gases (e.g., smoke, air, steam, grease laden vapors, etc.) generated during a cooking process for filtering.

SUMMARY

One embodiment relates to a cooking unit. The cooking unit includes a cooktop, a hood assembly coupled to the cooktop, a duct assembly coupled to the cooktop, and a fan. The cooktop defines a slot at least partially extending along a peripheral edge of the cooktop. The hood assembly includes a hood support extending upward from the cooktop and a hood coupled to the hood support. The hood support defines a conduit. The hood defines an intake and a hood chamber connecting the intake to the conduit of the hood support. The duct assembly includes ducting extending beneath the cooktop. The ducting connects the conduit of the hood support to the slot of the cooktop. The fan is positioned to drive air into the intake of the hood, through the hood chamber of the hood, through the conduit of the hood support, through the ducting, and out of the slot of the cooktop. At least a portion of the air exiting the slot of the cooktop returns to the intake of the hood such that an air curtain is generated between the slot of the cooktop and the intake of the hood.

Another embodiment relates to an air circulating unit. The air circulating unit includes a base, a hood assembly coupled to the base, a duct assembly coupled to the base, and a fan. The base defines a first aperture positioned along a periphery of the base. The hood assembly includes a hood support extending upward from the base and a hood coupled to the hood support. The hood support defines a conduit. The hood defines a second aperture fluidly coupled to the conduit of the hood support. The duct assembly includes ducting extending beneath the base. The ducting fluidly couples the conduit of the hood support to the first aperture of the base. The fan is positioned to circulate air through the hood assembly and the duct assembly such that an air curtain is generated between the first aperture of the base and the second aperture of the hood.

Still another embodiment relates to a cooking unit. The cooking unit include a cooktop, a hood assembly coupled to the cooktop, a duct assembly coupled to the cooktop, a fan, and a filtration system. The cooktop includes a peripheral edge, a cooking surface recessed relative to the peripheral edge of the cooktop, and an angled wall extending between the cooking surface and the peripheral edge. The angled wall defines an outlet. The cooking surface includes or is configured to support a cooking element. The cooking element includes at least one of an induction heating assembly, an electrically operated heating assembly, or a gas operated heating assembly. The hood assembly includes a hood support extending upward from the cooktop, a hood coupled to the hood support, and a grease filter. The hood support defines a conduit. The hood defines an inlet and a hood chamber fluidly coupling the inlet to the conduit of the hood support. The grease filter is disposed along the inlet. The duct assembly includes ducting extending beneath the cooktop. The ducting fluidly couples the conduit of the hood support to the outlet of the cooktop. The fan is disposed within the ducting. The fan is configured to drive air into the inlet of the hood, through the hood chamber of the hood, through the conduit of the hood support, through the ducting, and out of the outlet of the cooktop. At least a portion of the air exiting the outlet of the cooktop returns to the inlet of the hood such that an air curtain is generated between the outlet of the cooktop and the inlet of the hood. The filtration system is disposed within the ducting and positioned upstream of the fan. The filtration system is configured to neutralize at least one of particulates, odors, hydrocarbons, or grease laden vapors within the air.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 8 is a detailed view of the catalytic converter system of FIGS. 6 and 7, according to an exemplary embodiment.

FIGS. 9-16 show various components and arrangements of the catalytic converter system of FIG. 8, according to various exemplary embodiments.

FIG. 17 is a perspective view of a cooking unit, according to another exemplary embodiment.

FIG. 18 is a front view of the cooking unit of FIG. 17, according to an exemplary embodiment.

FIG. 19 is a side view of the cooking unit of FIG. 17 according to an exemplary embodiment.

FIG. 20 is a top view of the cooking unit of FIG. 17, according to an exemplary embodiment.

FIG. 21 is a front cross-sectional view of the cooking unit of FIG. 17, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a hood assembly for a unit (e.g., a cooking unit, a welding table, a lab table, etc.) extends above a surface and is configured to intake smoke, steam, air, grease laden vapors, hydrocarbons, and/or other gases (e.g., generated during cooking, generated during experimentation, generated during welding, etc.). The hood assembly is arranged to direct the smoke, steam, air, grease laden vapors, and/or other gases beneath the surface and filter and clean the smoke, steam, air, grease laden vapors, hydrocarbons, and/or other gases before either (i) recirculating the air back to the hood assembly or (ii) expelling filtered/cleaned air beneath the cooking surface. Accordingly, the hood assembly, to an observer, appears to be "ventless" as the filtered/cleaned air is not expelled by the hood assembly above the cooking surface as typically seen with traditional ventilation hoods.

Figure 1:
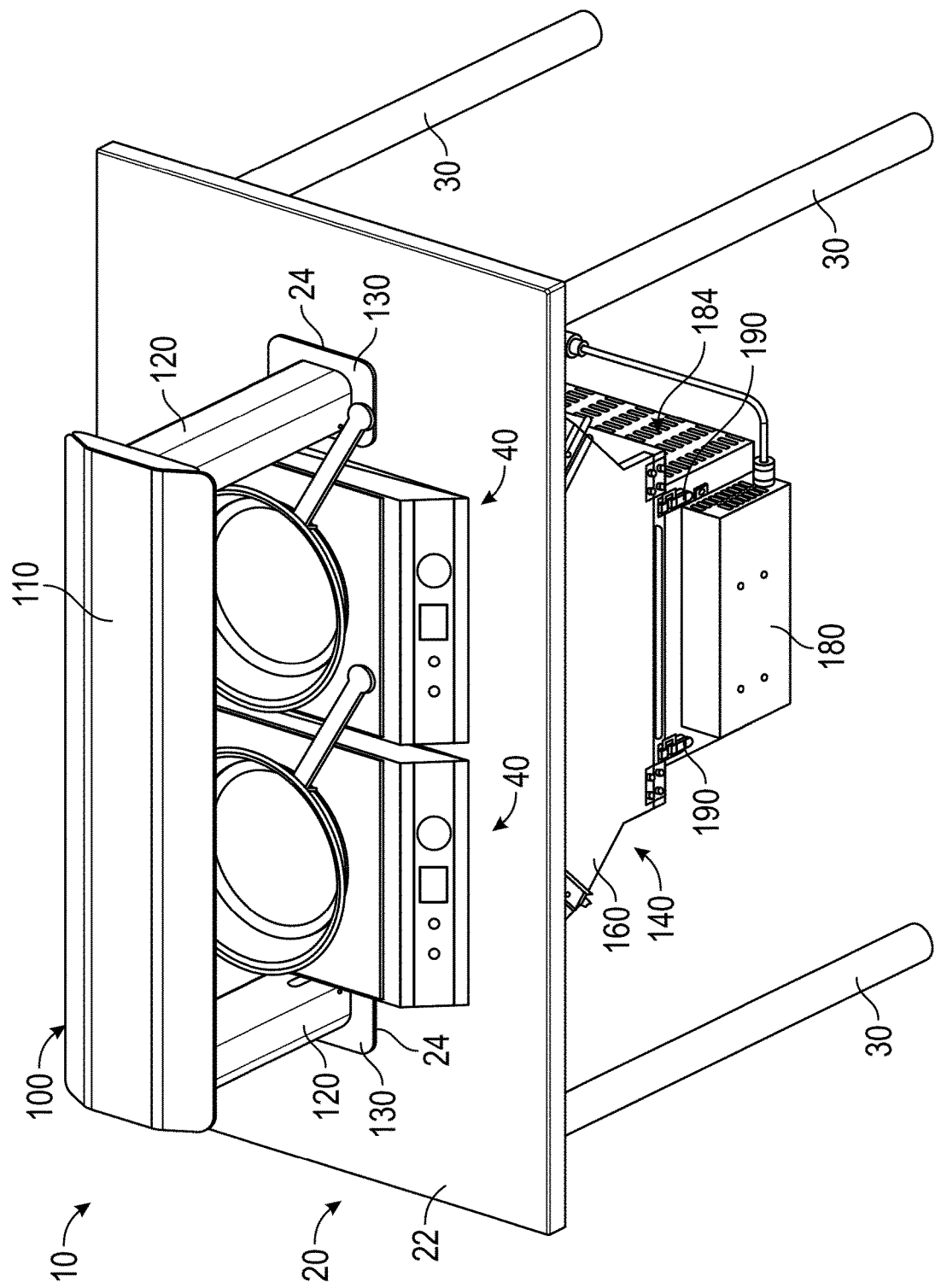
FIG. 1 is a perspective view of a cooking unit, according to an exemplary embodiment.
Figure 2:
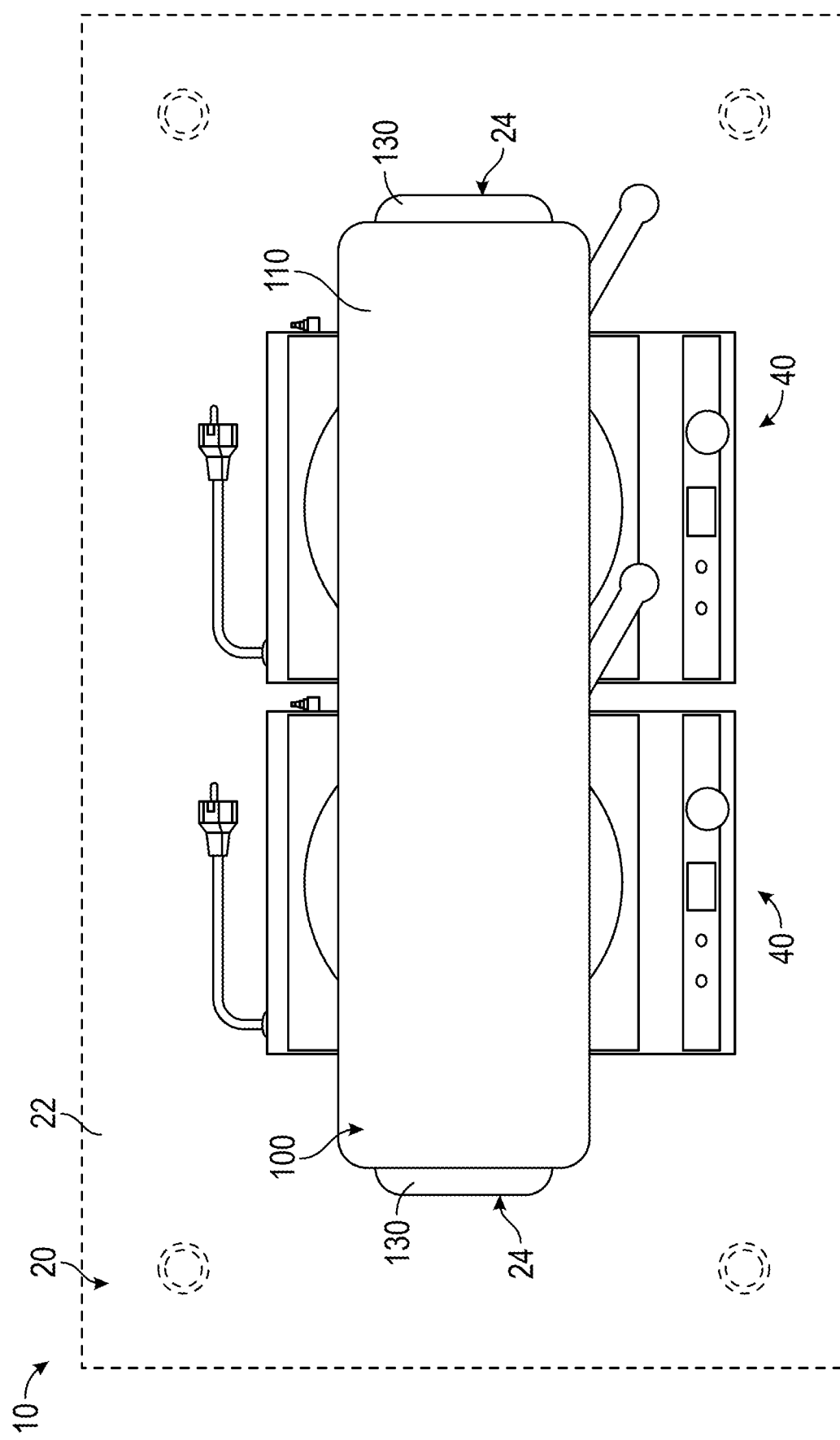
FIG. 2 is a top view of the cooking unit of FIG. 1, according to an exemplary embodiment.
Figure 3:
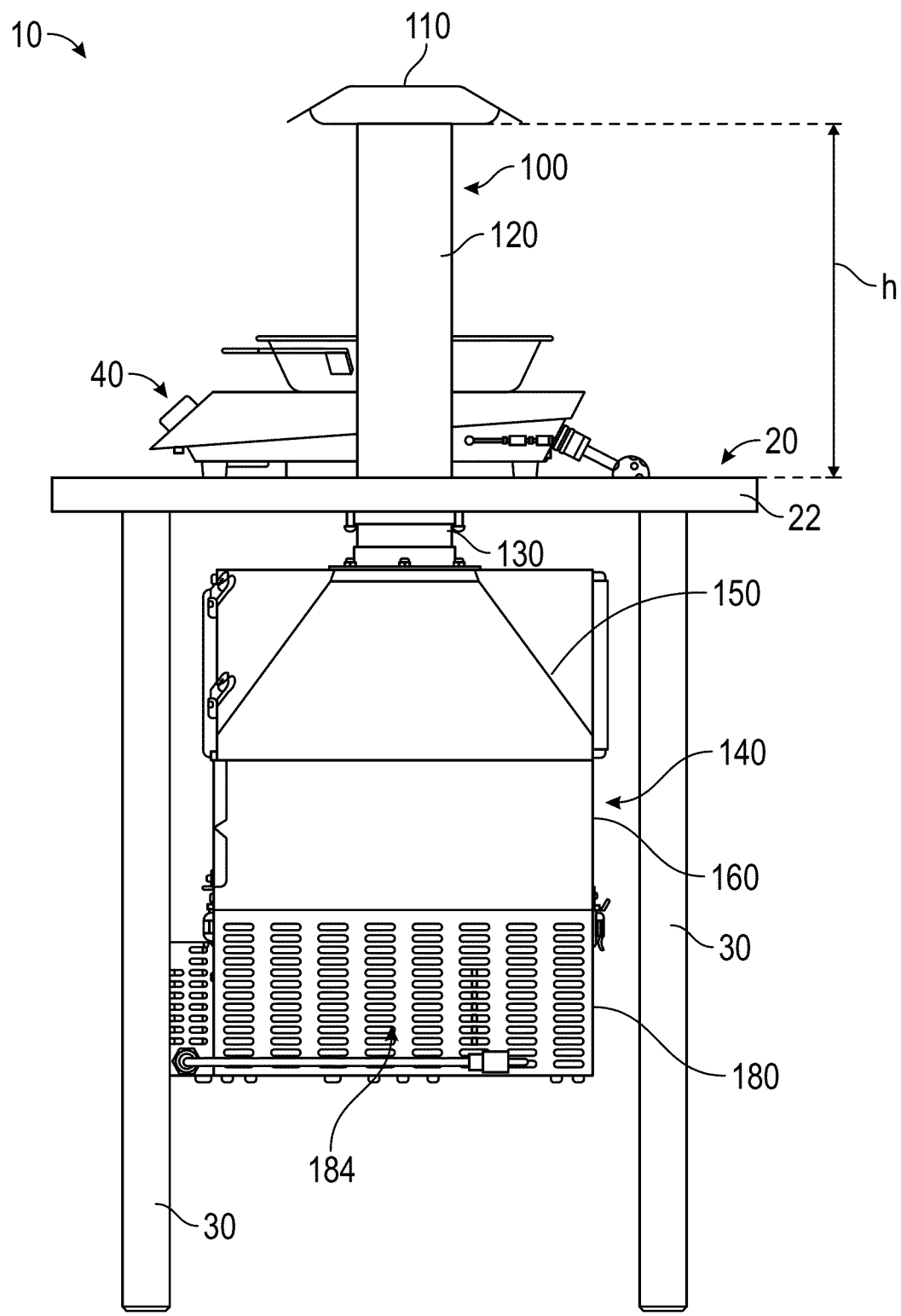
FIG. 3 is a side view of the cooking unit of FIG. 1 according to an exemplary embodiment.
Figure 4:
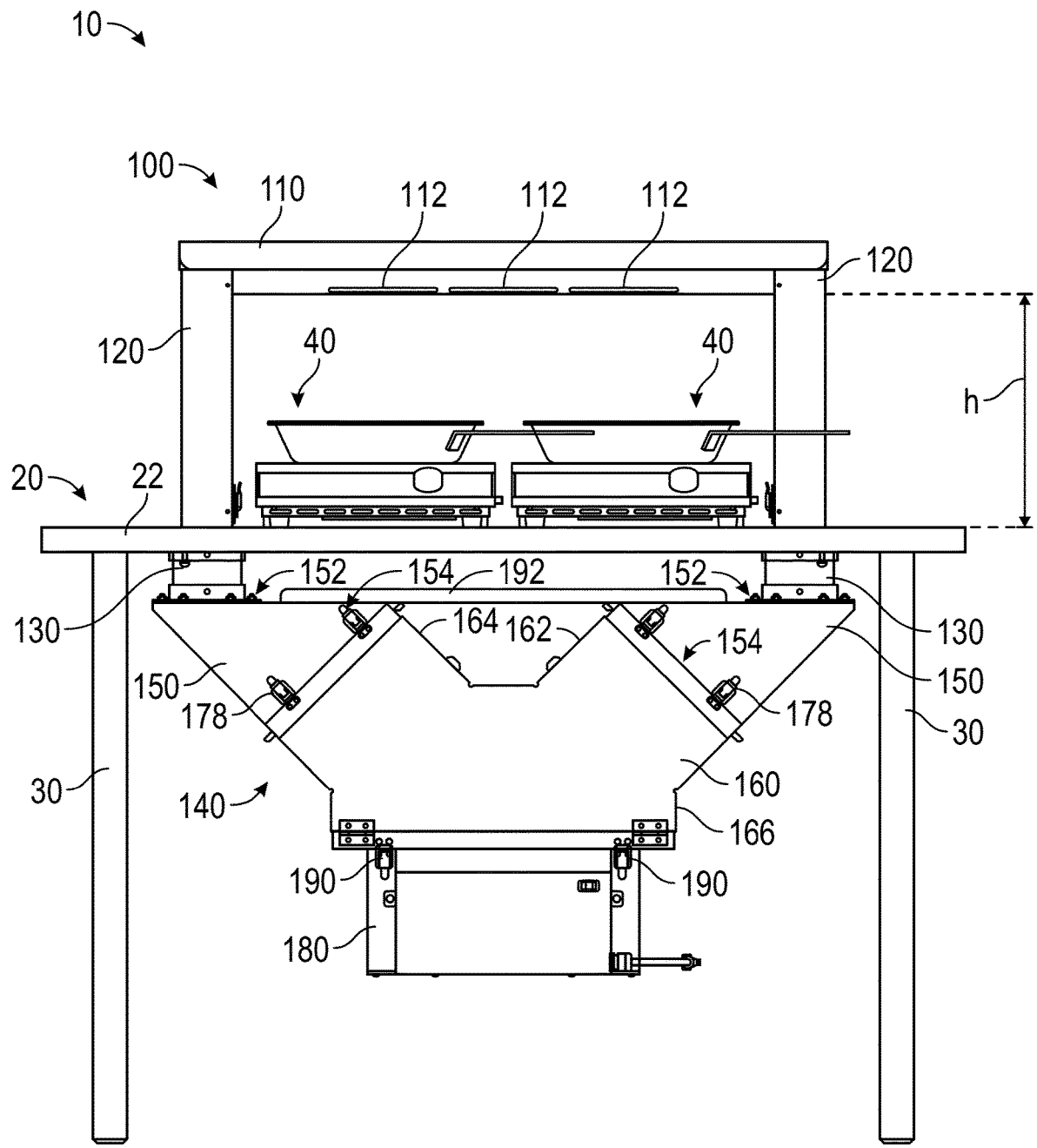
FIG. 4 is a front view of the cooking unit of FIG. 1, according to an exemplary embodiment.
Figure 5:
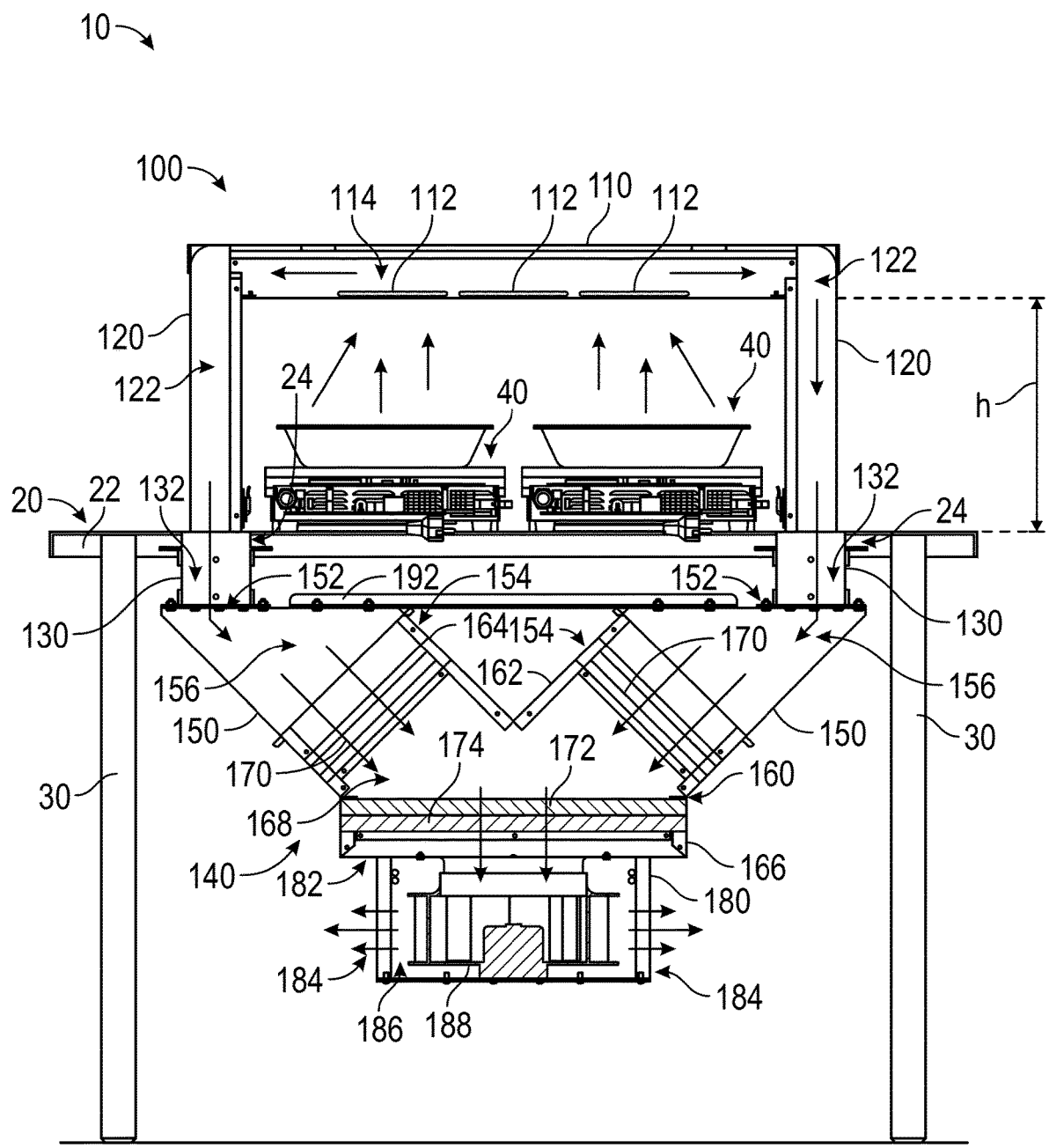
FIG. 5 is a cross-sectional view of the cooking unit of FIG. 4, according to an exemplary embodiment.

According to the exemplary embodiment shown in FIGS. 1-7, a cooking unit, shown as cooking unit 10, includes a base, shown as base 20, and a hood assembly, shown as hood assembly 100. As shown in FIGS. 1-5, the base 20 is structured as a table having a cooking surface, shown as tabletop 22, and a plurality of legs, shown as legs 30, coupled to and supporting the tabletop 22. As such, the cooking unit 10 may be portable (e.g., carried from one location to another, etc.). In some embodiments, the legs 30 have wheels that facilitate easier mobility of the cooking unit 10. In other embodiments, the base 20 is otherwise structured and/or is a fixed unit (e.g., a built-in cabinet unit, a built-in counter, a built-in structure, a built-in stove unit, etc.). As shown in FIGS. 1, 2, and 5, the tabletop 22 defines a plurality of apertures, shown as cutouts 24.

As shown in FIGS. 1-7, the cooking unit 10 includes a cooking system or element, shown as cooktop 40. According to various embodiments, the cooktop 40 is configured as an electric cooktop, an induction cooktop, and/or a gas cooktop. In other embodiments, the cooktop 40 is replaced with another type of cooking system such as a panini press, a grill, etc. While cooking food with the cooktop 40, smoke, steam, air, grease laden vapors, and/or other gases may be generated. According to an exemplary embodiment, the hood assembly 100 is positioned to draw in and filter the smoke, steam, air, grease laden vapors, and/or other gases and expel filtered air.

As shown in FIGS. 1-7, the hood assembly 100 includes a top portion, shown as hood 110; a plurality of supports, shown as hood supports 120, coupled to and supporting the hood 110 above the tabletop 22; couplers, shown as flanges 130, disposed within the cutouts 24 of the tabletop 22 and coupled to ends of the hood supports 120; and an under-table module, shown as duct and fan module 140, coupled to the flanges 130, opposite the hood supports 120, and positioned underneath the tabletop 22. While the hood assembly 100 is shown to include two hood supports 120 and two flanges 130, in other embodiments, the hood assembly 100 includes (i) one hood support 120 and flange 130 or (ii) three or more hood supports 120 and flanges 130 (e.g., three, four, etc. hood supports 120 and flanges 130). According to the exemplary embodiment shown in FIGS. 1-5, the cooktop 40 is accessible from both sides of the cooking unit 10. In other embodiments, the hood assembly 100 includes a back wall or back splash that extends from the tabletop 22 up to the hood 110 along one side of the cooktop 40 such that the cooktop 40 is accessible from only one side of the cooking unit 10.

As shown in FIGS. 4 and 5, the hood 110 defines a plurality of intake slots, shown as intakes 112, that lead to an interior chamber, shown as intake chamber 114, of the hood 110. As shown in FIGS. 1-5, the hood 110 is coupled to ends of the hood supports 120 and elevated a target distance h above the cooktop 40. In one embodiment, the target distance h is approximately nine inches. In other embodiments, the target distance h is less than nine inches (e.g., 8.5, 8, 7.5, 7, etc. inches.). In still other embodiments, the target distance h is greater than nine inches (e.g., 9.5, 10, 10.5, 11, 12, etc. inches.). In still other embodiments, a length of the hood supports 120 are selectively adjustable (e.g., extendable, retractable, telescopic, etc.) such that the height of the hood 110 is variable relative to the cooktop 40. According to an exemplary embodiment, the hood 110 is positioned above the cooktop 40 such that the intake chamber 114 receives smoke, steam, air, grease laden vapors, and/or other gases through the intakes 112 that may be generated during use of the cooktop 40. In one embodiment, the hood 110 is manufactured from a metallic material (e.g., stainless steel, etc.). In another embodiment, the hood 110 is manufactured from a transparent material (e.g., glass, etc.). A transparent hood 110 may facilitate positioning the hood 110 closer to the cooktop 40 without substantially obstructing the view of the operator using the cooktop 40.

As shown in FIG. 5, the hood supports 120 define interior channels, shown as hood support conduits 122, coupled to the intake chamber 114 of the hood 110. In other embodiments, only one of the hood supports 120 defines a hood support conduit 122. As shown in FIG. 5, the hood support conduits 122 are configured to receive and direct the smoke, steam, air, grease laden vapors, and/or other gases received by the intake chamber 114 of the hood 110 downward toward the duct and fan module 140. As shown in FIG. 5, the flanges 130 define interior channels, shown as flange conduits 132, coupled to the hood supports 120. In other embodiments, only one of the flanges 130 defines a flange conduit 132. As shown in FIG. 5, the flange conduits 132 are configured to receive and direct the smoke, steam, air, and/or other gases received by the hood support conduits 122 downward toward the duct and fan module 140.

As shown in FIGS. 1 and 3-5, the duct and fan module 140 includes a plurality of ducts, shown as branch ducts 150, coupled to and extending from the flanges 130; a filter housing, shown as filter box 160, coupled to the branch ducts 150; and a fan housing/system, shown as fan box 180, coupled to the filter box 160. As shown in FIGS. 4 and 5, the duct and fan module 140 includes two branch ducts 150. In other embodiments, the duct and fan module 140 includes a different number of branch ducts 150 (e.g., one, three, four, etc. branch ducts 150) to correspond with the number of hood supports 120 and flanges 130. As shown in FIGS. 4 and 5, each of the branch ducts 150 includes a first end, shown as duct inlet 152, coupled to the flanges 130 and an opposing second end, shown as duct outlet 154, coupled to the filter box 160. As shown in FIGS. 3-5, the branch ducts 150 are suspended beneath and spaced from the underside of the tabletop 22 by the flanges 130. As shown in FIGS. 4 and 5, the branch ducts 150 are coupled together by a bracket, shown as duct brace 192, extending between the branch ducts 150.

As shown in FIG. 5, each of the branch ducts 150 defines an interior chamber, shown as duct chamber 156, that is configured to receive smoke, steam, air, grease laden vapors, and/or other gases from the corresponding flange conduit 132 through the duct inlet 152 and directs the smoke, steam, air, and/or other gases into the filter box 160 through the duct outlet 154. As shown in FIGS. 4 and 5, the branch ducts 150 are angled downward toward the center of the cooking unit 10 (e.g., at a 30, 45, 60, etc. degree angle). According to an exemplary embodiment, angled branch ducts 150 allow grease and other liquids that condense within the hood assembly 100 to drip down into the filter box 160.

As shown in FIGS. 4 and 5, the filter box 160 includes a plurality of duct connectors, shown as filter box inlet connector 162 and filter box inlet connector 164, and an outlet, shown as filter box outlet 166. As shown in FIG. 5, the filter box 160 defines an interior chamber, shown as filter box chamber 168. As shown in FIGS. 4 and 5, the filter box inlet connector 162 and the filter box inlet connector 164 are releasably coupled to the branch ducts 150 via a plurality of couplers, shown as latches 178. According to an exemplary embodiment, the number of duct connectors of the filter box 160 correspond with the number of branch ducts 150. The filter box 160 may therefore include more or fewer duct connectors to correspond with a different number of branch ducts 150. As shown in FIG. 5, the filter box chamber 168 of the filter box 160 receives smoke, steam, air, grease laden vapors, and/or other gases from the branch ducts 150 through the filter box inlet connector 162 and the filter box inlet connector 164 and directs filtered air into the fan box 180 through the filter box outlet 166.

As shown in FIG. 5, the filter box 160 includes first filters or baffles, shown as grease filter elements 170, positioned within the filter box chamber 168, proximate the interfaces between (i) the duct outlets 154 of the branch ducts 150 and (ii) the filter box inlet connector 162 and the filter box inlet connector 164. According to an exemplary embodiment, the grease filter elements 170 are configured to collect grease that enters into the hood assembly 100 during use of the cooktop 40. As shown in FIG. 5, the filter box 160 includes a second filter, shown as air filter 172, and a third filter, shown as smoke and odor filter 174, positioned proximate the filter box outlet 166. According to an exemplary embodiment, (i) the air filter 172 is configured to remove particulates from the smoke, steam, air, grease laden vapors, and/or other gases generated during the cooking process and (ii) the smoke and odor filter 174 is configured to filter out smoke from the air and substantially neutralize any odors in the air (e.g., a charcoal filter, etc.).

As shown in FIGS. 1, 3, and 5, the fan box 180 includes an inlet, shown as fan box inlet 182, and a plurality of outlets (e.g., exhaust vents, etc.), shown as fan box outlets 184. As shown in FIG. 5, the fan box 180 defines an interior chamber, shown as fan box chamber 186. As shown in FIGS. 1 and 4, the fan box inlet 182 is releasably coupled to the filter box outlet 166 via a plurality of couplers, shown as latches 190. As shown in FIGS. 1 and 3-5, the fan box outlets 184 are angled relative to (e.g., perpendicular to, etc.) the fan box inlet 182 and face outward toward the sides of the cooking unit 10, away from an operator thereof. In other embodiments, the fan box outlets 184 are oriented in-line with or parallel with the fan box inlet 182 (e.g., face downward at the ground, etc.). In other embodiments, as shown in FIGS. 6 and 7, the fan box 180 is additionally or alternatively positioned in the hood 110 of the cooking unit 10.

As shown in FIG. 5, the fan box 180 includes an air driver, suction device, or blower, shown as fan 188, disposed within the fan box chamber 186. According to an exemplary embodiment, the fan 188 is configured to (i) draw smoke, steam, air, grease laden vapors, and/or other gases into the intake chamber 114 of the hood 110 through the intakes 112, through the hood support conduits 122, through the flange conduits 132, through the branch duct chambers 156, through the filter box chamber 168, and into the fan box chamber 186 and (ii) expel air out of the hood assembly 100 through the fan box outlets 184 beneath the tabletop 22. Accordingly, in operation, the hood 110 appears to be "ventless" because the gases drawn into the hood assembly 100 are not expelled above the tabletop 22 where traditional systems expel filtered air. Such an arrangement may be more desirable as the hood assembly 100 may provide for quieter operation (e.g., as the fan 188 is positioned beneath the tabletop 22 and away from the operator's head, etc.) and the air is not blown at or in the general direction of the operator. In some embodiments, the fan box outlets 184 are coupled to conduits (e.g., tubing, etc.) that expel the air or other contents outside of the room or building in which the cooking unit 10 is located (e.g., through a wall, through the floor, out a window, etc.).

Figure 6:
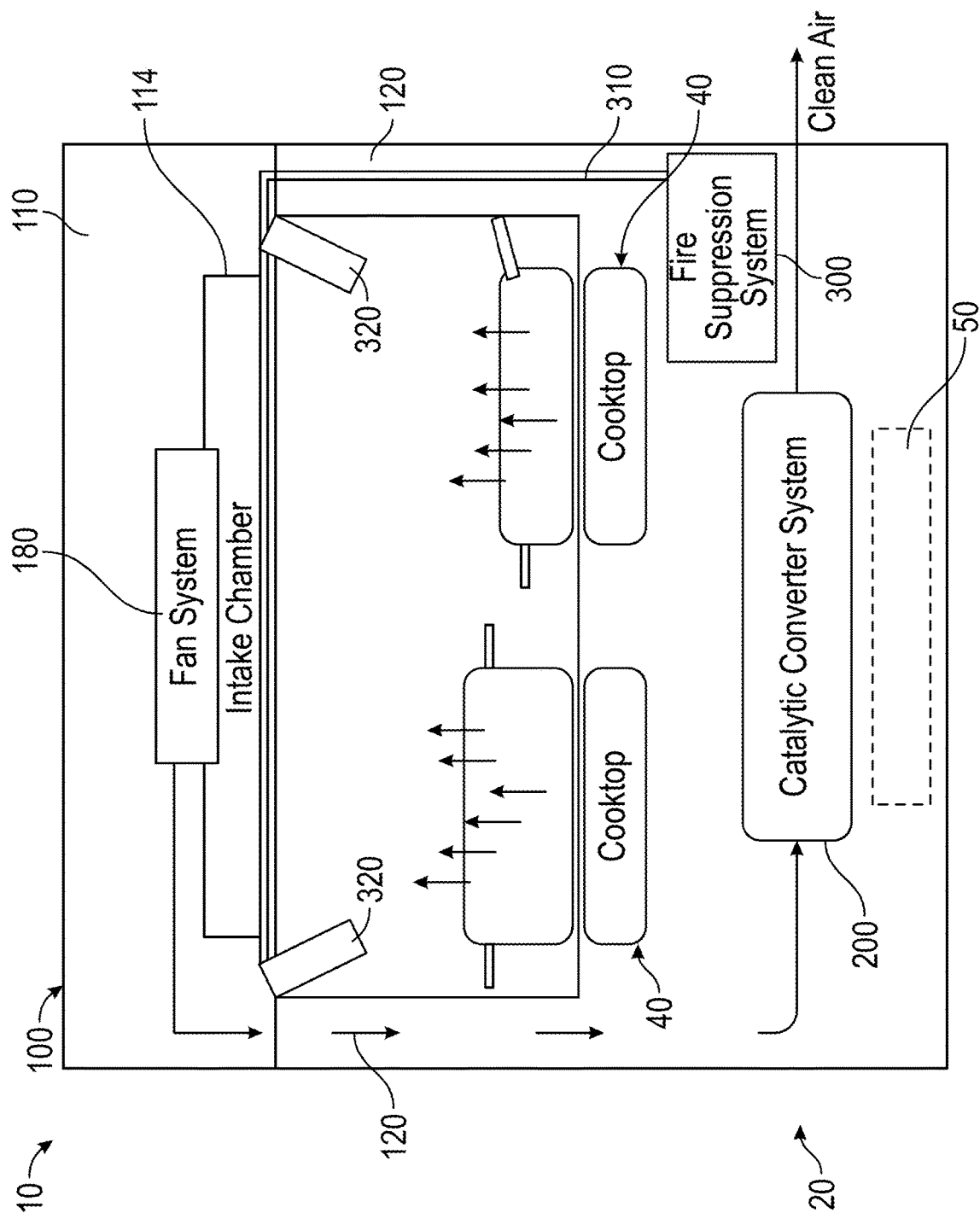
FIG. 6 is a schematic view of the cooking unit of FIG. 1 having a catalytic converter system, according to an exemplary embodiment.
Figure 7:
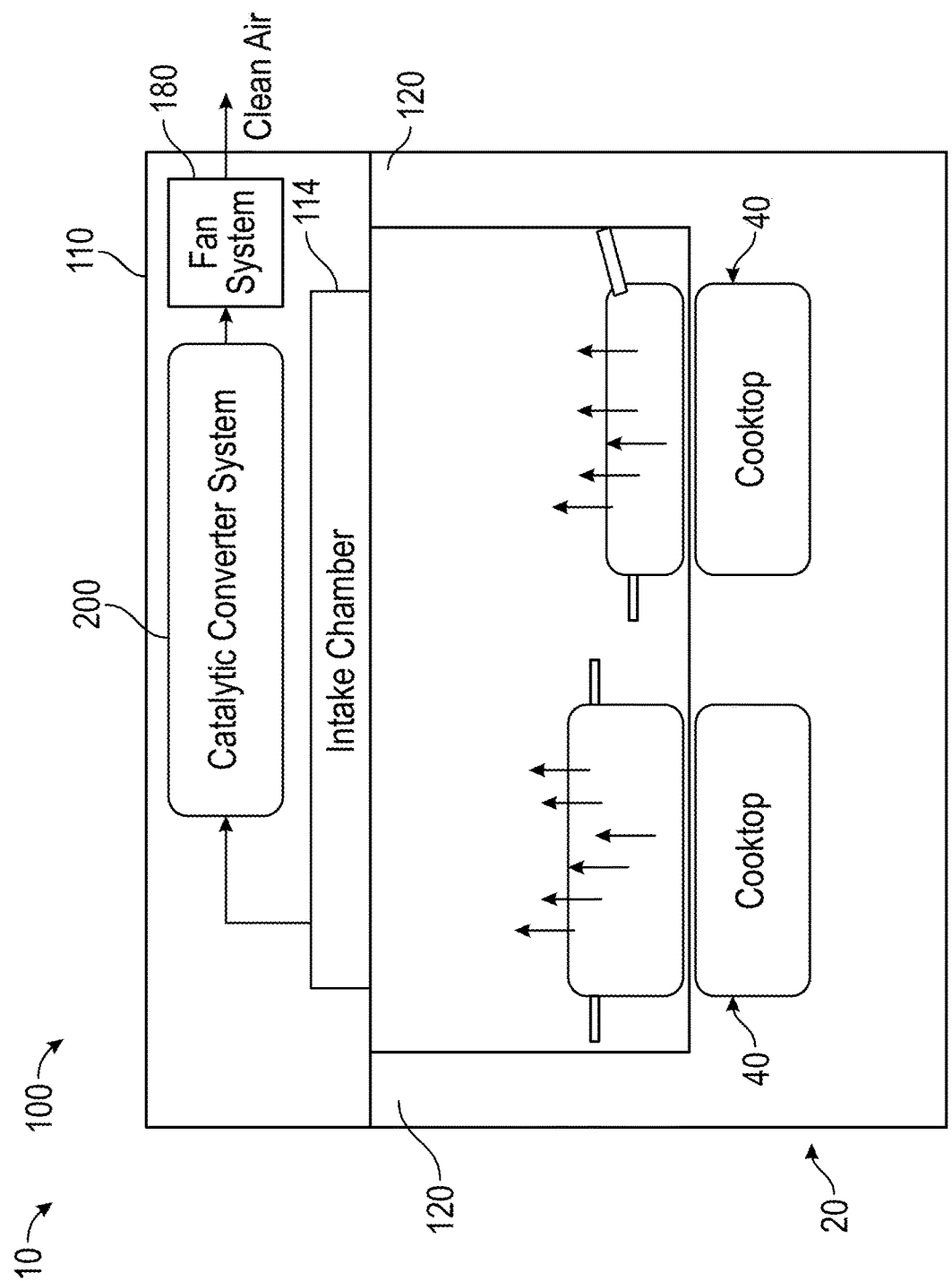
FIG. 7 is a schematic view of the cooking unit of FIG. 1 having a catalytic converter system, according to another exemplary embodiment.

As shown as in FIGS. 6 and 7, the cooking unit 10 includes a catalytic converter assembly, shown as catalytic converter system 200, and/or a fire suppression assembly, shown as fire suppression system 300. As shown in FIG. 6, the catalytic converter system 200 is positioned within the base 20 (e.g., below the tabletop 22, within the filter box chamber 168, etc.). As shown in FIG. 7, the catalytic converter system 200 is positioned within the hood 110. In such an embodiment, the hood 110 may be a standalone unit that is configured to expel filtered air above the base 20 (e.g., the hood 110 includes an exhaust vent, etc.).

As shown in FIG. 8, the catalytic converter system 200 is (i) positioned downstream of the grease filter elements 170 and (ii) positioned upstream of the air filter 172 and/or the smoke and odor filter 174. In some embodiments, the cooking unit 10 with the catalytic converter system 200 does not include one or more of the grease filter elements 170, the air filter 172, and the smoke and odor filter 174.

As shown in FIGS. 8-11, the catalytic converter system 200 includes a catalytic converter element, shown as catalytic converter 202. As shown in FIGS. 9-11, the catalytic converter 202 includes a housing, shown as housing 210, that defines an interior chamber, shown as chamber 212. As shown in FIG. 9, the housing 210 is a cylindrical tube and the chamber 212 is tubular or cylindrical. In other embodiments, the housing 210 has a different cross-sectional shape (e.g., square, rectangular, ovular, hexagonal, triangular, etc.). As shown in FIGS. 10 and 11, the housing 210 is a rectangular prism and the chamber 212 is rectangular. In other embodiments, the housing 210 and the chamber 212 of the catalytic converter 202 are differently shaped (e.g., a cube, a trapezoidal prism, a pyramid, a cone, a triangular prism, tapered, etc.). In some embodiments, the housing 210 is manufactured from a metallic material (e.g., a ferrous material, stainless steel, metal alloys, etc.). In some embodiments, the housing 210 is manufactured from a ceramic material. In other embodiments, the housing 210 is manufactured from another suitable material. As shown in FIG. 11, the catalytic converter system 200 includes a first conduit, shown as inlet conduit 242, coupled to an inlet of the housing 210 and a second conduit, shown as outlet conduit 244, coupled to an outlet of the housing 210. According to an exemplary embodiment, the inlet conduit 242 and the outlet conduit 244 are tapered to expand to the size of the inlet and the outlet of the housing 210 of the catalytic converter 202.

Figure 12:
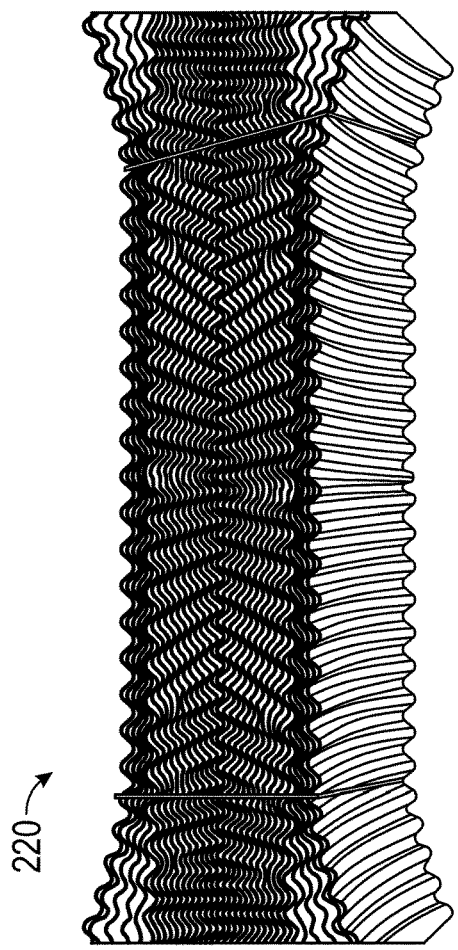

As shown in FIGS. 9 and 10, the catalytic converter 202 includes a catalyst or catalytic substrate, shown as catalytic substrate 220, disposed within the chamber 212 of the housing 210 of the catalytic converter 202. As shown in FIG. 12, the catalytic substrate 220 includes a plurality of layers. The plurality of layers may be arranged in stacked configuration, a honeycomb configuration, and/or still another configuration. The plurality of layers may be flat, corrugated, and/or still otherwise shaped. Other shapes and/or arrangements are possible. According to an exemplary embodiment, the catalytic substrate 220 is manufactured from or has a coating of platinum, palladium, rhodium, and/or other suitable precious metals.

As shown in FIGS. 9-11, the catalytic converter 202 includes one or more thermal elements, shown as heating elements 230. As shown in FIG. 9, the heating elements 230 are wound (e.g., coiled, etc.) around an exterior of the housing 210. As shown in FIGS. 10 and 11, the heating elements 230 are disposed along a top surface and a bottom surface of the housing 210. In other embodiments, the heating elements 230 are disposed on one of the top surface or the bottom surface of the housing 210. In an alternative embodiment, the heating elements 230 are disposed within the chamber 212 of the housing 210.

According to an exemplary embodiment, the heating elements 230 are positioned to selectively thermally regulate (i.e., heat) the housing 210 of the catalytic converter 202, the chamber 212 of the housing 210, and/or the catalytic substrate 220 disposed therein to a target temperature. The heating elements 230 may be induction heating elements (e.g., that provide an induction magnetic field to heat a metallic catalytic substrate and/or a metallic housing of the catalytic converter 202, etc.), resistive heating elements, conduits that receives a heated working fluid, and/or still other suitable types of heating elements capable of heating the housing 210 of the catalytic converter 202, the chamber 212 of the housing 210, and/or the catalytic substrate 220 disposed therein to the target temperature.

According to an exemplary embodiment, heating the housing 210, the chamber 212, and/or the catalytic substrate 220 of the catalytic converter 202 to the target operating temperature is configured to facilitate neutralizing various grease laden vapors directed over the catalytic substrate 220. By way of example, as grease laden vapors interact with the heated catalysts of the catalytic substrate 220, the grease laden vapors may be neutralized and decomposed into less harmful compounds. As an example, hydrocarbons (HC) in the grease laden vapors may be heated and interact with the catalytic substrate 220 to be converted into water ($H_2O$) and carbon dioxide ($CO_2$). As another example, nitrogen oxides (NOx) gases in the grease laden vapors may be heated and interact with the catalytic substrate 220 to be converted into nitrogen ($N_2$) and oxygen ($O_2$). In some embodiments, the heating elements 230 are selectively controllable to vary the temperature of the housing 210, the chamber 212, and/or the catalytic substrate 220 of the catalytic converter 202 based on the type of food being cooked and, therefore, efficiently neutralize the resultant grease laden vapors emitted therefrom during the cooking process.

In some embodiments, the cooking unit 10 includes a system that facilitates providing an electrical current directly to and through the catalytic substrate 220. Passing the electrical current thought the catalytic substrate 220 may be used to heat the catalytic substrate 220 in addition to or in replace of using the heating elements 230. By way of example, the catalytic substrate 220 may function as a resistor that heats up as electrical current is provided thereto such that the catalytic substrate 220 functions like a resistive heating element. In some embodiments, the catalytic substrate 220 is or includes a biocatalyst that facilitates performing electrostatic enzymatic catalysis.

Figure 13:
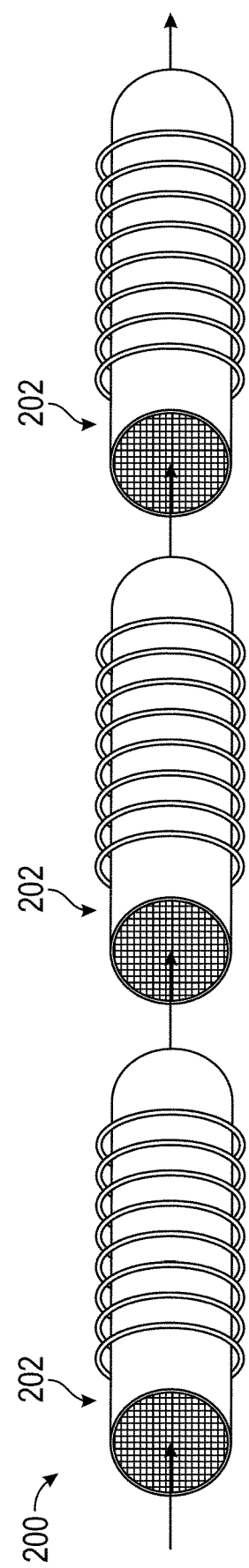

As shown in FIGS. 13 and 14, the catalytic converter system 200 includes a plurality of catalytic converters 202 (e.g., two, three, four, etc.) arranged in a series configuration to form a multi-stage catalytic converter system. Is some embodiments, the catalytic substrate 220 in each successive catalytic converter 202 of the catalytic converter system 200 has progressively smaller openings defined therein (e.g., a first catalytic substrate 220 has 200 cells per square inch ("cpsi"), a second catalytic substrate 220 has 400 cpsi, a third catalytic substrate 220 has 800 cpsi, etc.). In some embodiments, the catalytic converter system 200 includes a plurality of catalytic converters 202 arranged in a parallel configuration. In some embodiments, the catalytic converter system 200 includes a first set of catalytic converters 202 arranged in a parallel configuration positioned in series with a second set of catalytic converters 202 arranged in a parallel configuration.

Figure 16:
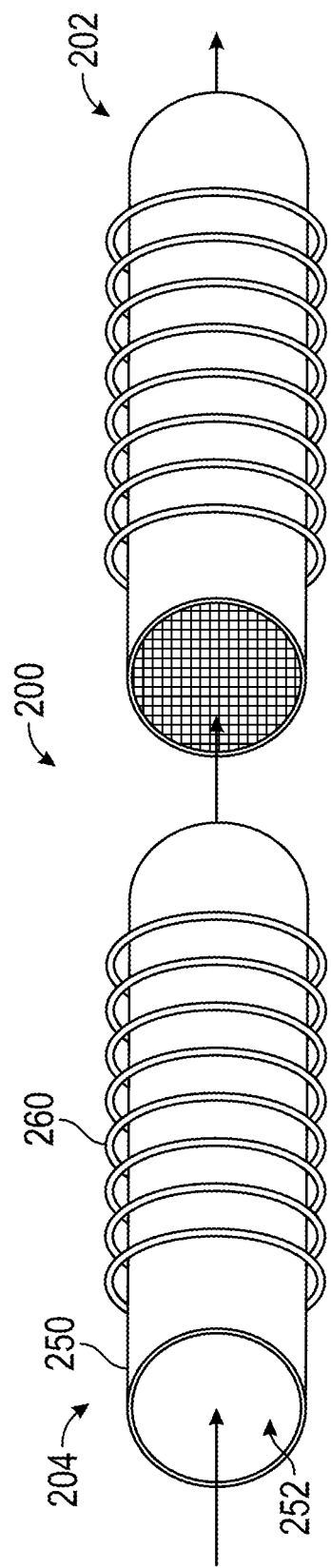

As shown in FIGS. 15 and 16, the catalytic converter system 200 includes a preheat device (e.g., a boost heat chamber, an intake preheat chamber, a heat exchanger, etc.), shown as preheat assembly 204, positioned upstream of and in series with the catalytic converter 202. In some embodiments, the preheat assembly 204 and the catalytic converter 202 are arranged in a single housing. In some embodiments, sets of preheat assemblies 204 and catalytic converters 202 are arranged in parallel with each other. In embodiments where the catalytic converter system 200 includes the preheat assembly 204, the catalytic converter 202 may include the heating elements 230 (see, e.g., FIG. 16) or the catalytic converter 202 may not include the heating elements 230 (see, e.g., FIG. 15). As shown in FIGS. 15 and 16, the preheat assembly 204 includes a housing, shown as housing 250, that defines an interior chamber, shown as preheat chamber 252. While the housing 250 is shown as a cylindrical tube, the housing 250 may be a differently shaped tube, a rectangular prism, a cube, a trapezoidal prism, a pyramid, a cone, a triangular prism, tapered, etc. In some embodiments, the housing 250 is manufactured from a metallic material (e.g., a ferrous material, stainless steel, metal alloys, etc.). In some embodiments, the housing 250 is manufactured from a ceramic material. In other embodiments, the housing 250 is manufactured from another suitable material.

As shown in FIGS. 15 and 16, the preheat assembly 204 includes one or more thermal elements, shown as heating elements 260, wound (e.g., coiled, etc.) around an exterior of the housing 250. In other embodiments, the heating elements 260 are disposed along a top surface, a bottom surface, and/or a side surface of the housing 250. In still other embodiments, the heating elements 260 are disposed within the preheat chamber 252. According to an exemplary embodiment, the heating elements 260 are positioned to selectively thermally regulate (i.e., heat) the housing 250 and/or the preheat chamber 252 to a target temperature. The heating elements 260 may be induction heating elements, resistive heating elements, conduits that receives a heated working fluid, and/or still other suitable types of heating elements capable of heating the housing 250 and/or the preheat chamber 252 to or at least partially to the target temperature. In some embodiments (e.g., embodiments where the catalytic converter 202 includes the heating elements 230, etc.), the heating elements 260 are configured to preheat the gasses received by the hood assembly 100 to supplement the heating elements 230 of the catalytic converter 202 with heating the gasses to the target temperature. In some embodiments (e.g., embodiments where the catalytic converter 202 does not include the heating elements 230, etc.), the heating elements 260 are configured to preheat the gasses received by the hood assembly 100 to the target temperature.

As shown in FIG. 6, the base 20 of the cooking unit 10 includes one or more selectively accessible chambers, shown as compartments 50. The compartments 50 may be drawers, cabinets, shelves, etc. According to an exemplary embodiment, the thermal energy generated by the heating elements 230 and/or the heating elements 260 of the catalytic converter system 200 are configured to selectively heat the compartments 50. The compartments 50 may therefore be warming drawers, heated shelfs, warming cabinets, etc.

In some embodiments, the cooktop 40, the heating elements 230, and/or the heating elements 260 are powered by a single or the same power source (e.g., a single power inverter, etc.). In some embodiments, the cooktop 40, the heating elements 230, and the heating elements 260 are independently powered by a respective source.

As shown in FIG. 6, the fire suppression system 300 includes components disposed within the base 20 of the cooking unit 10. The components may include a reservoir configured to hold a fire suppressing agent, a pump, etc. Such components may additionally or alternatively be disposed within the hood 110. As shown in FIG. 6, the fire suppression system 300 includes a conduit, shown as agent conduit 310, that extends from the base 20 to the hood 110. In some embodiments, the agent conduit 310 is disposed within the hood supports 120 (e.g., hidden from sight, etc.). As shown in FIG. 6, the fire suppression system 300 includes one or more outlets, shown as agent nozzles 320, disposed along the agent conduit 310 and positioned to direct the fire suppressing agent at the cooktop 40 (e.g., to facilitate suppressing a fire, a grease fire, etc.). In some embodiments, the fire suppression system 300 is manually activated by an operator (e.g., by pressing a button, pulling a lever, etc.). In some embodiments, the fire suppression system 300 is configured to detect a fire hazard (e.g., via a fire sensing device, sensor, etc.) and automatically dispense the fire suppressing agent in response to detecting the fire hazard.

According to the exemplary embodiment shown in FIGS. 17-22, a cooking unit, shown as cooking unit 400, includes a base, shown as cooktop 402; a hood assembly, shown as hood assembly 430, coupled to and positioned above the cooktop 402; and a duct assembly, shown as ducting 450, coupled to and positioned below the cooktop 402. The cooktop 402 includes an edge, shown as peripheral edge 404, extending around a periphery of the cooktop 402; a support surface, shown as cooking surface 406, recessed a depth d (e.g., one-half, one, two, three, four, etc. inches) relative to the peripheral edge 404; a first longitudinal wall and a second longitudinal wall, shown as longitudinal walls 408, extending between the front sides and the rear sides of the peripheral edge 404 and the cooking surface 406; and a first lateral wall and a second lateral wall, shown as lateral walls 410, extending between the right sides and the left sides of the peripheral edge 404 and the cooking surface 406. In some embodiments, the cooktop 402 does not include the longitudinal walls 408 and the lateral walls 410 such that the cooking surface 406 is not recessed the depth d relative to the peripheral edge 404 (i.e., the peripheral edge 404 and the cooking surface 406 are co-planar).

As shown in FIGS. 17-22, the longitudinal walls 408 are oriented at an angle relative to the cooking surface 406 (e.g., not perpendicular to, etc.) and the lateral walls 410 are oriented substantially perpendicular to the cooking surface 406 (e.g., substantially vertical, etc.). By way of example, the longitudinal walls 408 may be oriented at angle between zero and ninety degrees (e.g., fifteen, thirty, forty-five, sixty, seventy-five etc. degrees). In some embodiments, both the longitudinal walls 408 and the lateral walls 410 are oriented at an angle relative to the cooking surface 406. In some embodiments, the longitudinal walls 408 are oriented substantially perpendicular to the cooking surface 406 and the lateral walls 410 oriented at an angle relative to the cooking surface 406. In some embodiments, both the longitudinal walls 408 and the lateral walls 410 are oriented substantially perpendicular to the cooking surface 406.

As shown in FIGS. 17 and 20, the longitudinal walls 408 define a plurality of apertures (e.g., outlets, intakes, inlets, etc.), shown as cooktop vents 412. In some embodiments, the lateral walls 410 additionally or alternatively define the cooktop vents 412. In some embodiments, only one of the longitudinal walls 408 define the cooktop vents 412 (e.g., the longitudinal wall 408 positioned along a front side of the cooking unit 400, etc.). According to the exemplary embodiment shown in FIGS. 17 and 20, the cooktop vents 412 are shaped like elongated slots. In other embodiments, the cooktop vents 412 are otherwise shaped. By way of example, the cooktop vents 412 may be perforations or round holes. According to an exemplary embodiment, the cooktop vents 412 function like air nozzles. In some embodiments, the cooktop 402 includes external nozzles or baffles coupled to the cooktop vents 412. The external nozzles or baffles may be selectively re-orientable at various angles (e.g., manually adjustable, adjustable via an actuator and a user interface, automatically by a controller and an actuator based on a position of a hood, etc. as described in more detail herein).

As shown in FIGS. 17-19, 21, and 22, the cooking surface 406 is configured to support a cooking element, shown as cooking appliance 420. In some embodiments, the cooking appliance 420 is a portable cooking appliance that may be selectively removable from the cooking surface 406. The portable cooking appliance may be or include a portable gas operated grill or stove device, a portable electrically operated grill or stove device, a portable induction range, a portable panini grill/press, a portable waffle maker, a portable griddle, a portable toaster, and/or still other portable cooking appliances. In such an embodiment, a portion of the cooking unit 400 (e.g., the cooking surface 406, etc.) may include a power outlet or gas hookup to facilitate operating the portable cooking appliance. In some embodiments, the cooking appliance 420 is integrated into the cooking surface 406. By way of example, the cooking appliance 420 may be or include a gas cooktop, an electric cooktop, an induction cooktop, a gas grill, a hibachi grill, and/or still other cooking appliances that can be integrated into the cooking surface 406.

In some embodiments, the cooktop 402 is integrated into a fixed surface or structure. By way of example, the cooktop 402 may be integrated into a cabinet, a counter, and/or the like. In some embodiments, the cooktop 402 is integrated into a portable structure. By way of example, the cooktop 402 may be integrated into a portable cart. In some embodiments, the cooking unit 400 is or is integrated into a standalone unit.

As shown in FIGS. 17-22, the hood assembly 430 includes a top portion, shown as hood 432; a bracket, shown hood bracket 434, coupled to an underside and rear portion of the hood 432; and a plurality of supports, shown as hood supports 442, having first ends coupled to the hood bracket 434 and second ends coupled to the cooktop 402 by a plurality of flanges, shown as flanges 446, thereby supporting the hood 432 above the cooking surface 406. While the hood assembly 430 is shown to include two hood supports 442, in other embodiments, the hood assembly 430 includes one hood support 442 or three or more hood supports 442 (e.g., three, four, etc. hood supports 442). According to the exemplary embodiment shown in FIGS. 17-22, the cooktop 402 is accessible from both sides of the cooking unit 400. In other embodiments, the hood assembly 430 includes a back wall or back splash that extends from the cooktop 402 up to the hood 432 along one side of the cooktop 402 such that the cooktop 402 is accessible from only one side of the cooking unit 400. In still other embodiments, the hood supports 442 are coupled to the corners of the hood 432 such that the cooktop 402 is accessible from all sides thereof.

Figure 22:
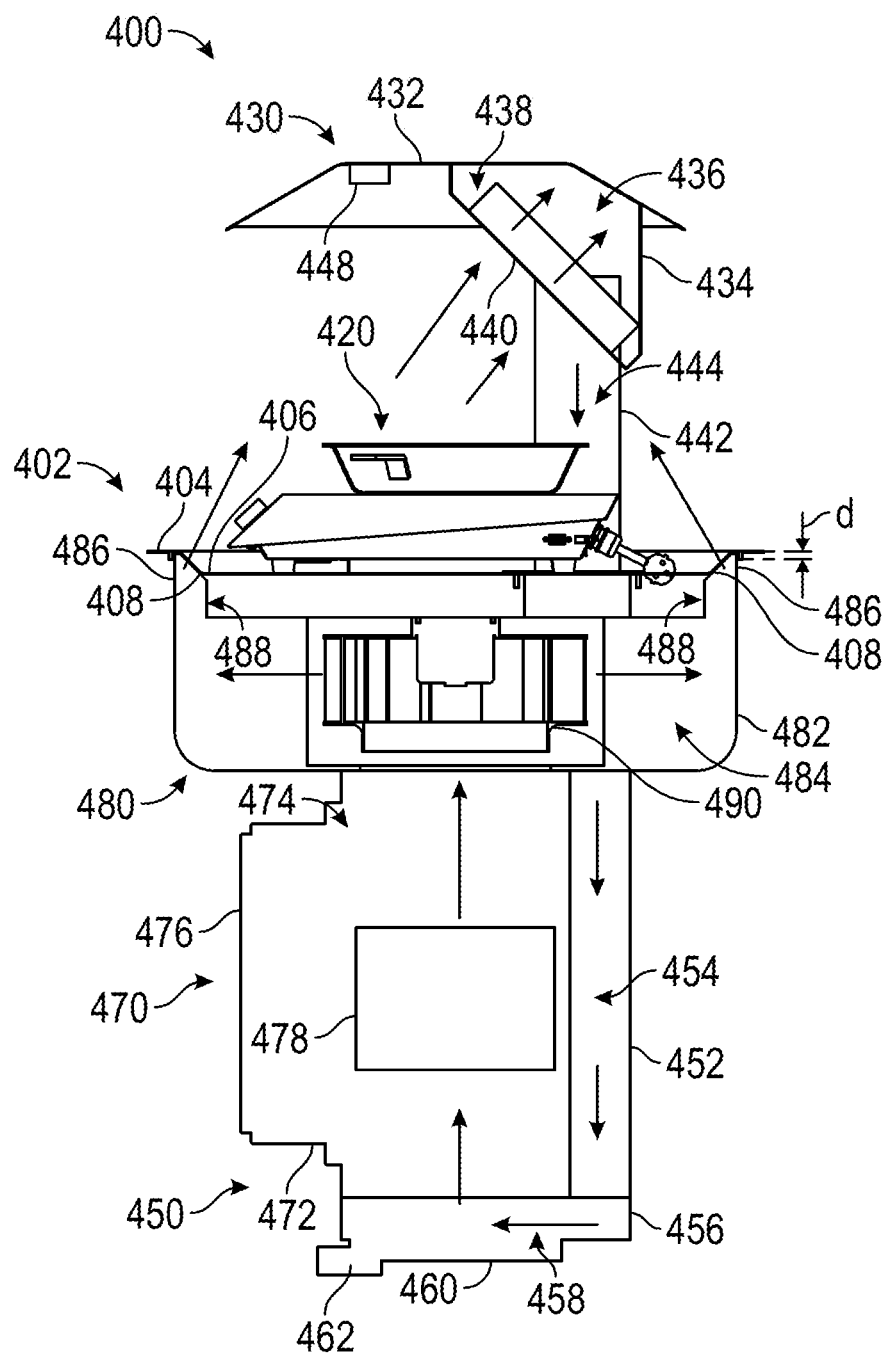
FIG. 22 is a side cross-sectional view of the cooking unit of FIG. 17, according to an exemplary embodiment.

As shown in FIGS. 18, 21, and 22, the hood bracket 434 has a surface that defines a plurality of apertures or slots (e.g., inlets, intakes, outlets, etc.), shown as hood vents 438, and the hood assembly 430 includes a plurality of filters, shown as grease filters 440, disposed along, over, and/or within the hood vents 438. As shown in FIGS. 21 and 22, the hood bracket 434 defines an interior chamber, shown as hood chamber 436, coupled to the hood vents 438. According to the exemplary embodiment shown in FIGS. 18 and 22, the surface of the hood bracket 434 that defines the hood vents 438 is angled such that the grease filters 440 slope away from the front of the cooking unit 400 (i.e., the top end is closer to the front than the bottom end, the bottom end is closer to the rear than the top end).

According to an exemplary embodiment, the hood 432 and the hood bracket 434 are position above the cooktop 402 such that the hood chamber 436 receives smoke, steam, air, grease laden vapors, hydrocarbons, and/or other gases that may be generated during use of the cooking appliance 420 through the hood vents 438. In one embodiment, the hood 432 is manufactured from a metallic material (e.g., stainless steel, etc.). In another embodiment, the hood 432 is manufactured from a transparent material (e.g., glass, polycarbonates, etc.). In another embodiment, the hood 432 is manufactured from a non-transparent material, but includes transparent portions disposed therealong (e.g., windows, etc.). A transparent hood and/or a hood having transparent portions may facilitate positioning the hood 432 closer to the cooktop 402 without substantially obstructing the view of the operator using the cooking appliance 420.

As shown in FIGS. 18 and 19, the hood 432 is elevated a height h above the cooktop 402 by the hood supports 442. In one embodiment, the length of the hood supports 442 is not adjustable such that the height h of the hood 432 is fixed relative to the cooktop 402. In some embodiments, the height h is selected based on the angle of the longitudinal walls 408. In other embodiments, the length of the hood supports 442 is selectively adjustable (e.g., extendable, retractable, telescopic, etc.) such that the height h of the hood 432 is variable relative to the cooktop 402.

As shown in FIGS. 21 and 22, the hood supports 442 define interior channels, shown as hood support conduits 444, coupled to the hood chamber 436 of the hood bracket 434. In other embodiments, only one of the hood supports 442 defines a hood support conduit 444. As shown in FIGS. 21 and 22, the hood support conduits 444 are configured to receive and direct the smoke, steam, air, grease laden vapors, hydrocarbons, and/or other gases received by the hood chamber 436 of the hood bracket 434 downward though the cooktop 402 into the ducting 450 positioned beneath the cooktop 402.

In some embodiments, as shown in FIGS. 17, 19, 21, and 22, the hood assembly 430 includes one or more lighting elements, shown as lighting elements 448, disposed along an underside of the hood 432. According to an exemplary embodiment, the lighting elements 448 are positioned to illuminate the cooking surface 406. The lighting elements 448 may include light emitting diodes ("LEDs"), incandescent light bulbs, fluorescent light bulbs, and/or the like. In some embodiments, the lighting elements 448 are additionally or alternatively otherwise positioned about the cooking unit 400.

As shown in FIGS. 17-19, 21, and 22, the ducting 450 includes first ducts, show as vertical ducts 452, coupled to and extending downward from an underside of the cooktop 402; a second duct, shown as connecting duct 456, coupled to the vertical ducts 452; a third duct, shown as filtration duct 470, coupled to the connecting duct 456; and a fourth duct, shown as fan duct 480, coupled to the filtration duct 470 and the cooktop vents 412 of the cooktop 402. As shown in FIGS. 21 and 22, the vertical ducts 452 define an interior channel, shown as conduits 454, coupled to (i) the hood support conduits 444 of the hood supports 442 and (ii) an interior chamber, shown as intermediate chamber 458, of the connecting duct 456. As shown in FIGS. 17-19, 21, and 22, the ducting 450 includes a base pan, shown as drain pan 460, coupled along a bottom surface of the connecting duct 456. According to an exemplary embodiment, the drain pan 460 is configured to collect liquid (e.g., water, grease, etc.) that condenses as the air, steam, grease laden vapors, etc. travel through the hood assembly 430 and/or the ducting 450. As shown in FIGS. 17-19, 21, and 22, the drain pan 460 includes an outlet, shown as drain outlet 462, that facilitates selectively draining the liquid within the drain pan 460.

As shown in FIGS. 17-19, 21, and 22, the filtration duct 470 includes (i) a housing, shown filtration system housing 472, that defines an interior chamber, shown as filtration chamber 474, coupled to the intermediate chamber 458 of the connecting duct 456 and (ii) a door, shown as filter door 476, coupled to the filtration system housing 472. The filter door 476 is configured to facilitate selectively accessing the filtration chamber 474 (e.g., to replace, maintain, inspect, etc. components positioned within the filtration chamber 474).

As shown in FIGS. 21 and 22, the cooking unit 400 includes a filtering system, shown as filtration system 478, disposed within the filtration chamber 474. According to an exemplary embodiment, the filtration system 478 is configured to neutralize particulates, odors, hydrocarbons, grease laden vapors, etc. as air is cycled therethrough. In some embodiments, the filtration system 478 is or includes an electrostatic precipitator. In some embodiments, the filtration system 478 is or includes the catalytic converter system 200. In some embodiments, the filtration system 478 is or includes one or more filters. By way of example, the one or more filters may be or include the air filter 172 and/or the smoke and odor filter 174.

As shown in FIGS. 17-19, 21, and 22, the fan duct 480 includes (i) a housing, shown as fan housing 482, that defines an first interior chamber, shown as fan chamber 484, coupled to the filtration chamber 474 of the filtration system housing 472 and (ii) a plurality of extensions, shown as diffusers 486, (a) that each define a second interior chamber, shown as diffuser chamber 488, and (b) extending from the front and back of the fan housing 482 and interfacing with the underside of the longitudinal walls 408, thereby coupling the fan chamber 484 to the cooktop vents 412. In some embodiments, the diffusers 486 additionally or alternatively extend from the right and/or left sides of the fan housing 482 to interface with the underside of the lateral walls 410 (e.g., in embodiments where the lateral walls 410 define the cooktop vents 412, etc.). As shown in FIGS. 18 and 21, the diffusers 486 have a first end coupled to the fan chamber 484 that has a first width and a second end coupled to the underside of the cooktop 402 that has a second width that is larger than the first width. Accordingly, the diffusers 486 have a tapered or angled profile.

As shown in FIGS. 21 and 22, the cooking unit 400 includes an air driver, shown as fan 490, disposed within the fan chamber 484. According to the exemplary embodiment shown in FIGS. 21 and 22, the fan 490 is configured to (i) drive contaminated air (e.g., air containing hydrocarbons, grease laden vapors, smoke, odor, etc.) (a) into the hood vents 438 of the hood bracket 434 through the grease filters 440 and into the hood chamber 436 of the hood bracket 434, (b) through the hood chamber 436 of the hood bracket 434 into the hood support conduits 444 of the hood supports 442, (c) through the hood support conduits 444 of the hood supports 442 into the conduits 454 of the vertical ducts 452, (d) through the conduits 454 of the vertical ducts 452 into the intermediate chamber 458 of the connecting duct 456, (e) through the intermediate chamber 458 of the connecting duct 456 into the filtration chamber 474 of the filtration system housing 472, and (f) through the filtration chamber 474 and the filtration system 478 to clean the contaminated air and (ii) drive the clean air (a) into the fan chamber 484 of the fan housing 482, (b) through the fan chamber 484 into the diffuser chambers 488 of the diffusers 486, (c) through the diffuser chambers 488 of the diffusers 486, and (d) out of the cooktop vents 412 of the cooktop 402. According to an exemplary embodiment, at least a portion of the clean air exiting the cooktop vents 412 of the cooktop 402 (e.g., at least 75%, etc.) returns to the hood vents 438 of the hood bracket 434 such that an air curtain is generated between the cooktop vents 412 of the cooktop 402 and the hood vents 438 of the hood bracket 434.

In other embodiments, the fan 490 is configured to drive the contaminated air through the hood assembly 430 and the ducting 450 in the opposite direction. In such embodiments, the fan 490 is configured to circulate the air such that the air curtain is provided from the hood vents 438 of the hood bracket 434 down to the cooktop vents 412 of the cooktop 402, rather than from the cooktop vents 412 of the cooktop 402 up to the hood vents 438 of the hood bracket 434. In such embodiments, the grease filters 440 may be disposed along, over, and/or within the cooktop vents 412 of the cooktop 402 and/or the fan 490 may be repositioned into a location after the filtration system 478 (e.g., within the hood assembly 430, within the connecting duct 456, the position of the fan 490 and the filtration system 478 are flipped etc.).

Figure 23:
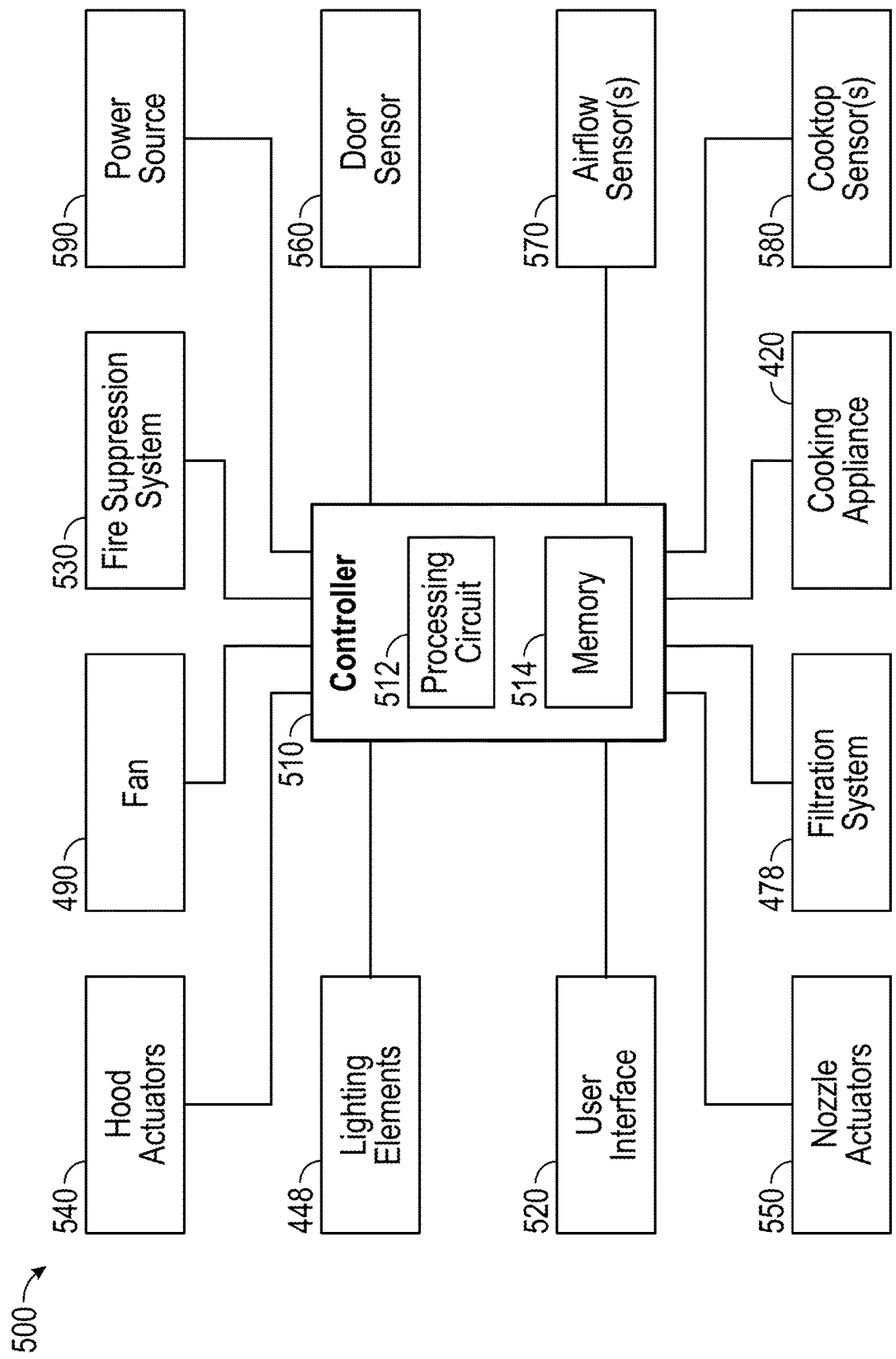
FIG. 23 is a schematic block diagram of the cooking unit of FIG. 17, according to an exemplary embodiment.

As shown in FIG. 23, the cooking unit 400 includes a control system, shown as control system 500, including a controller device, shown as controller 510. In one embodiment, the controller 510 is configured to selectively engage, selectively disengage, control, and/or otherwise communicate with components of the cooking unit 400. As shown in FIG. 23, the controller 510 is coupled to the cooking appliance 420, the lighting elements 448, the filtration system 478, the fan 490, a user input/output device or user interface 520, a fire suppression system 530, first actuators or hood actuators 540, second actuators or nozzle actuators 550, a plurality of sensors including a door sensor 560, one or more airflow sensors 570, and one or more cooktop sensors 580, and a power source 590. In other embodiments, the controller 510 is coupled to more or fewer components. By way of example, the controller 510 may send and receive signals with the cooking appliance 420, the lighting elements 448, the filtration system 478, the fan 490, the user interface 520, the fire suppression system 530, the hood actuators 540, the nozzle actuators 550, the door sensor 560, the airflow sensors 570, the cooktop sensors 580, and/or the power source 590.

The controller 510 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 23, the controller 510 includes a processing circuit 512 and a memory 514. The processing circuit 512 may include an ASIC, one or more FPGAs, a DSP, circuits containing one or more processing components, circuitry for supporting a microprocessor, a group of processing components, a graphics card, or any other suitable electronic processing components. In some embodiments, the processing circuit 512 is configured to execute computer code stored in the memory 514 to facilitate the activities described herein. The memory 514 may be any volatile or non-volatile computer-readable storage medium capable of storing data or computer code relating to the activities described herein. According to an exemplary embodiment, the memory 514 includes computer code modules (e.g., executable code, object code, source code, script code, machine code, etc.) configured for execution by the processing circuit 512.

According to an exemplary embodiment, the user interface 520 facilitates communication between an operator (e.g., cook, chef, staff member, etc.) of the cooking unit 400 and one or more components (e.g., the cooking appliance 420, the fan 490, etc.) of the cooking unit 400. By way of example, the user interface 520 may include at least one of an interactive display, a touchscreen device, one or more buttons, and switches (e.g., to turn the unit off, to allow a user to set a target temperature, to turn a lighting element on and off, to set a fan speed, etc.). In one embodiment, the user interface 520 includes a notification device (e.g., alarm, light, display, etc.) that notifies the operator regarding operation of the cooking unit 400 (e.g., on, off, temperature, error messages, etc.). An operator may use the user interface 520 to manually set operating parameters of the cooking unit 400. In some embodiments, the user interface 520 is provided by a portable device (e.g., a smartphone, a tablet, a smartwatch, a laptop, etc.) wirelessly coupled (e.g., via Wi-Fi, Bluetooth, etc.) to the cooking unit 400.

According to an exemplary embodiment, the controller 510 is configured to control the lighting elements 448 (e.g., on/off, color, blinking, etc.) in response to (i) an operator command via the user interface 520 and/or (ii) detecting an error (e.g., filter missing, filter replacement necessary, door ajar, cooking appliance misaligned, etc.) via the door sensor 560, the airflow sensors 570, and/or the cooktop sensors 580. According to an exemplary embodiment, the controller is configured to control a speed setpoint of the fan 490 (i) in response to an operator command via the user interface 520 and/or (ii) based on readings acquired by the cooktop sensors 580. By way of example, an operator may want the cooking unit 400 to operate in a quiet mode. During the quiet mode, the controller 510 may operate the fan 490 at a low speed setpoint. By way of another example, the operator may select to operate the fan 490 at various speeds (e.g., low, fast, medium, etc.) via the user interface 520 based on the amount of smoke and gasses being emitted from the cooktop 402. By way of another example, the controller 510 may be configured to automatically adjust the speed setpoint of the fan 490 based on readings from the cooktop sensors 580 indicating an amount of smoke and gasses being emitted from the cooktop 402 (e.g., set to a low speed if little smoke, set to a high speed if a lot of smoke, etc.). According to an exemplary embodiment, the controller 510 is configured to control a component of the filtration system 478 during operation of the cooking unit 400. By way of example, the controller 510 may be configured to control a temperature of the catalytic converter 202 (e.g., by controlling the current provided to the catalytic substrate 220, by controlling a temperature of the heating elements 230, etc.). By way of another example, the controller 510 may be configured to control the flow of power to the electrostatic precipitator.

According to an exemplary embodiment, the fire suppression system 530 is substantially similar to the fire suppression system 300 disclosed herein (i.e., includes nozzles coupled to the hood assembly 430 and directed at the cooktop 402 to emit fire suppression agent thereon to facilitate extinguishing a fire). In other embodiments, the fire suppression system 530 is configured to emit the fire suppressing agent within the air curtain provided by the fan 490 (e.g., out of the cooktop vents 412). The controller 510 may be configured to automatically activate the fire suppression system 530 in response to detecting a fire (e.g., via the cooktop sensors 580, etc.) or in response to receiving an operator command (e.g., via the user interface 520, etc.).

According to an exemplary embodiment, the hood actuators 540 are positioned to facilitate lifting or lowering the hood 432 (e.g., in embodiments where the hood supports 442 are adjustable, etc.). The controller 510 may be configured to control the hood actuators 540 to adjust the height of the hood 432 in response to an operator command via the user interface 520. According to an exemplary embodiment, the nozzle actuators 550 are positioned to facilitate changing an angle at which a nozzles, deflector, or a nozzle assembly disposed over the cooktop vents 412 are oriented. By way of example, the cooking unit 400 may include the nozzles, deflector, or nozzle assembly disposed over the cooktop vents 412. The orientation of the nozzles, deflector, or nozzle assembly may be manually adjustable or adjustable via the nozzle actuators 550 to control an angle at which the air curtain is emitted from the cooktop vents 412. The controller 510 may be configured to control the nozzle actuators 550 (i) in response to an operator command via the user interface 520 and/or (ii) in response to the height of the hood 432 raising or lowering (e.g., inward if the hood 432 is lowered, outward if the hood 432 is raised, etc.).

According to an exemplary embodiment, the door sensor 560 is positioned to facilitate detecting a position (i.e., open or closed) of the filter door 476. The controller 510 is configured to (i) provide an error notification on the user interface 520 (e.g., a visual error message on a display, an audible error message via a speaker, etc.), (ii) provide an error notification via the lighting elements 448 (e.g., flash red, yellow, orange, etc.), and/or (iii) prevent operation of the cooking unit 400 in response to the door sensor 560 indication that the filter door 476 is open.

According to an exemplary embodiment, the airflow sensors 570 are positioned to facilitate detecting a flow rate of the air through the hood assembly 430 and/or the ducting 450 (e.g., within the hood chamber 436, within the hood support conduits 444, within the ducting 450 upstream of the filtration system 478, within the ducting 450 downstream of the filtration system 478 and upstream of the fan 490, within the dusting 450 downstream of the fan 490, etc.). The controller 510 is configured to (i) provide an error notification on the user interface 520 (e.g., a visual error message on a display, an audible error message via a speaker, etc.), (ii) provide an error notification via the lighting elements 448 (e.g., flash red, yellow, orange, etc.), and/or (iii) prevent operation of the cooking unit 400 in response to the flow rate of the air being (a) greater than a first threshold indicating that a component of the filtration system 478 is not installed in the filtration chamber 474 and/or (b) less than a second threshold indicating at least one of a leak, blockage in the grease filters 440, and/or blockage in the filtration system 478. Such a determination by the controller 510 may be based on or account for a current speed setpoint of the fan 490 as the flow rate will also depend on the air flow generated by the fan 490 (e.g., a higher flow rate when the fan 490 is operating at a higher speed setpoint, a lower flow rate when the fan 490 is operating at a lower speed setpoint, etc.)

According to an exemplary embodiment, the cooktop sensors 580 may include various types of sensors to monitor the activities at the cooktop 402. By way of example, the cooktop sensors 580 may be or include a fire detection sensor configured to detect when a fire is present. The controller 510 may be configured to activate the fire suppression system 530 in response to a fire being detected. By way of another example, the cooktop sensors 580 may be or include a smoke sensor configured to detect an amount of gases/smoke being emitted from the cooktop 402. The controller 510 may be configured to control the speed setpoint of the fan 490 based on the amount of gases/smoke detected. By way of another example, the cooktop sensors 580 may be or include position detection sensors configured to detect the position of the cooking appliances 420 (e.g., when the cooking appliances 420 are portable appliances, etc.). The controller 510 may be configured to (i) provide an error notification on the user interface 520 (e.g., a visual error message on a display, an audible error message via a speaker, etc.), (ii) provide an error notification via the lighting elements 448 (e.g., flash red, yellow, orange, etc.), and/or (iii) prevent operation of the cooking unit 400 in response to the cooking appliance 420 being in an incorrect position (e.g., not centered under the hood 432, etc.).

In one embodiment, the power source 590 is an electrical connector (e.g., a power cord, etc.) that facilitates connecting the cooking unit 400 to a mains power source (e.g., an electrical grid via an electrical outlet, etc.). In some embodiments, the power source 590 additionally or alternatively includes an on-board power storage and/or supply device (e.g., a battery, a solar panel, a solar generator, a combustion generator, etc.) that facilitates generating, storing, and/or providing power to electrical components of the cooking unit 400 to facilitate operating the cooking unit 400 when not near an external power source (e.g., the cooking unit 400 may therefore be a mobile unit, etc.). The power source 590 may be rechargeable and/or interchangeable. In some embodiments, the power source 590 additionally or alternatively includes a gas storage tank that facilitates operating a gas operated appliance. In some embodiments, the power source 590 additionally or alternatively includes a gas connector that facilitates connecting the cooking unit 400 to an external gas supply to facilitate operating a gas operated appliance.

According to the exemplary embodiment shown in FIGS. 24-27, a cooking unit, shown as cooking unit 600, includes a base, shown as cooktop 602; a hood assembly, shown as hood assembly 630, coupled to and positioned above the cooktop 602; and a duct assembly, shown as ducting 650, coupled to and positioned below the cooktop 602. The cooktop 602 includes an edge, shown as peripheral edge 604, extending around a periphery of the cooktop 602; a support surface, shown as cooking surface 606, recessed a depth d (e.g., one-half, one, two, three, four, etc. inches) relative to the peripheral edge 604; a first longitudinal wall and a second longitudinal wall, shown as longitudinal walls 608, extending between the front sides and the rear sides of the peripheral edge 604 and the cooking surface 606; and a first lateral wall and a second lateral wall, shown as lateral walls 610, extending between the right sides and the left sides of the peripheral edge 604 and the cooking surface 606. In some embodiments, the cooktop 602 does not include the longitudinal walls 608 and the lateral walls 610 such that the cooking surface 606 is not recessed the depth d relative to the peripheral edge 604 (i.e., the peripheral edge 604 and the cooking surface 606 are co-planar).

Figure 24:
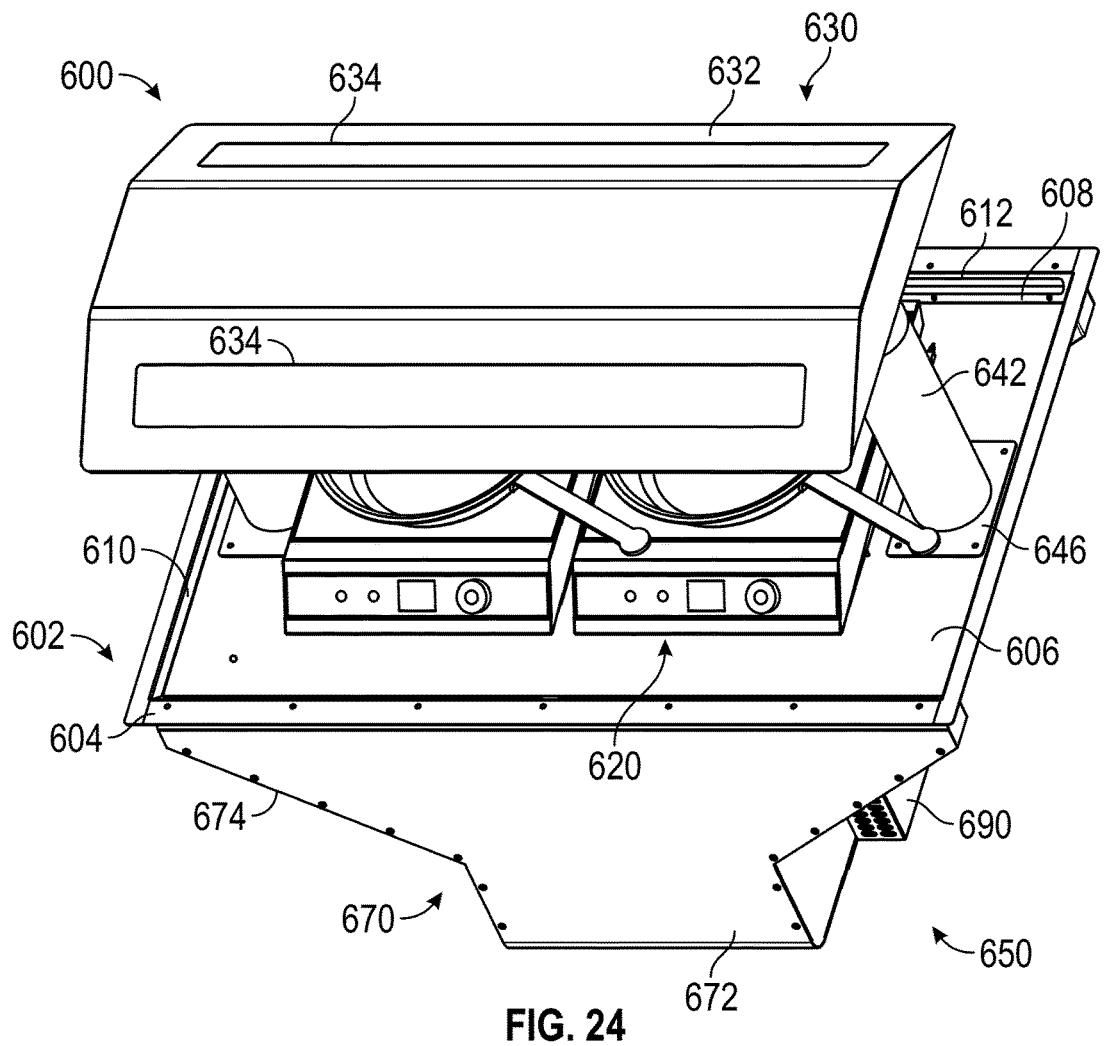
FIG. 24 is a perspective view of a cooking unit, according to still another exemplary embodiment.
Figure 25:
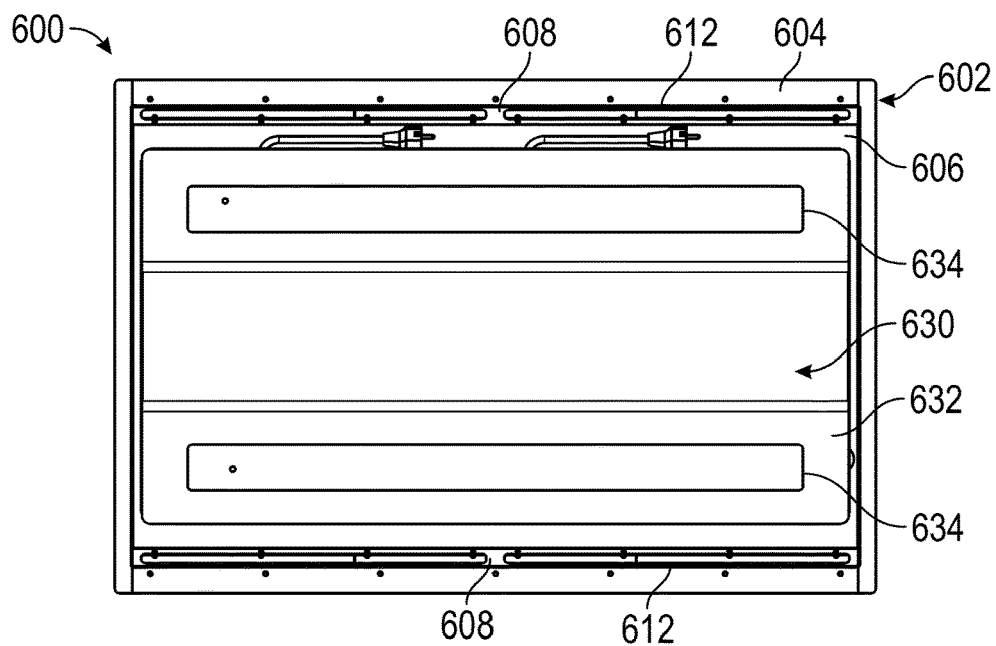
FIG. 25 is a top view of the cooking unit of FIG. 24, according to an exemplary embodiment.
Figure 27:
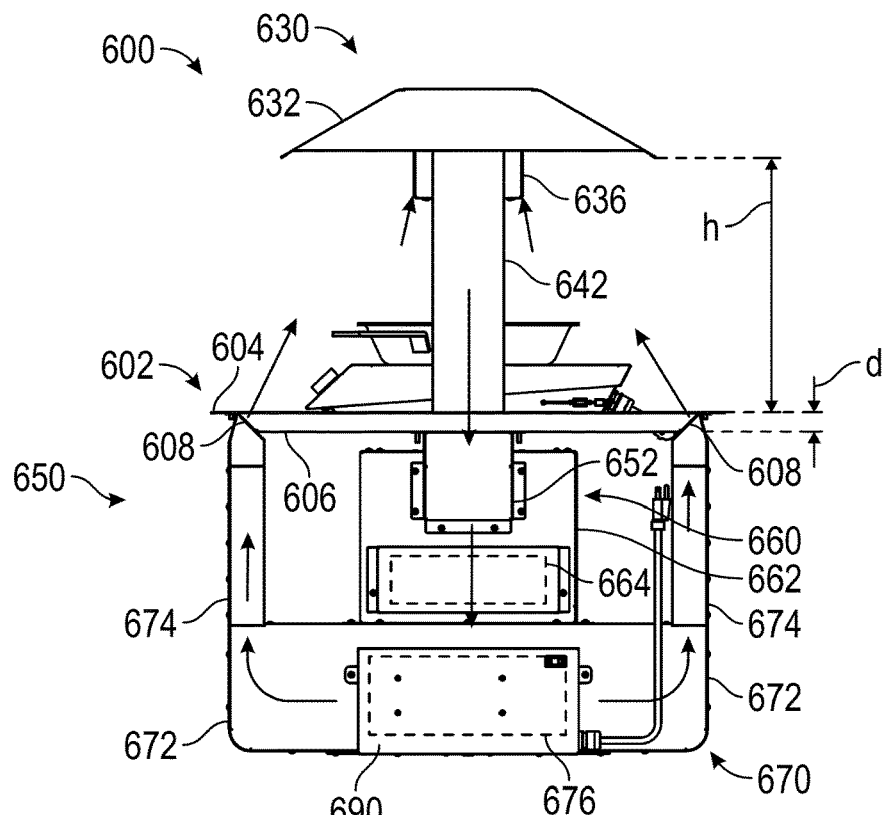
FIG. 27 is a side view of the cooking unit of FIG. 24, according to an exemplary embodiment.

As shown in FIGS. 24, 25, and 27, the longitudinal walls 608 are oriented at an angle relative to the cooking surface 606 (e.g., not perpendicular to, etc.) and the lateral walls 610 are oriented substantially perpendicular to the cooking surface 606 (e.g., substantially vertical, etc.). By way of example, the longitudinal walls 608 may be oriented at angle between zero and ninety degrees (e.g., fifteen, thirty, forty-five, sixty, seventy-five etc. degrees). In some embodiments, both the longitudinal walls 608 and the lateral walls 610 are oriented at an angle relative to the cooking surface 606. In some embodiments, the longitudinal walls 608 are oriented substantially perpendicular to the cooking surface 606 and the lateral walls 610 oriented at an angle relative to the cooking surface 606. In some embodiments, both the longitudinal walls 608 and the lateral walls 610 are oriented substantially perpendicular to the cooking surface 606.

As shown in FIGS. 24 and 25, the longitudinal walls 608 define a plurality of apertures (e.g., outlets, intakes, inlets, etc.), shown as cooktop vents 612. In some embodiments, the lateral walls 610 additionally or alternatively define the cooktop vents 612. In some embodiments, only one of the longitudinal walls 608 define the cooktop vents 612 (e.g., the longitudinal wall 608 positioned along a front side of the cooking unit 600, etc.). According to the exemplary embodiment shown in FIGS. 24 and 25, the cooktop vents 612 are shaped like elongated slots. In other embodiments, the cooktop vents 612 are otherwise shaped. By way of example, the cooktop vents 612 may be perforations or round holes. According to an exemplary embodiment, the cooktop vents 612 function like air nozzles. In some embodiments, the cooktop 602 includes external nozzles or baffles coupled to the cooktop vents 612. The external nozzles or baffles may be selectively re-orientable at various angles (e.g., manually adjustable, adjustable via an actuator and a user interface, automatically by a controller and an actuator based on a position of a hood, etc. as described in more detail herein).

Figure 26:
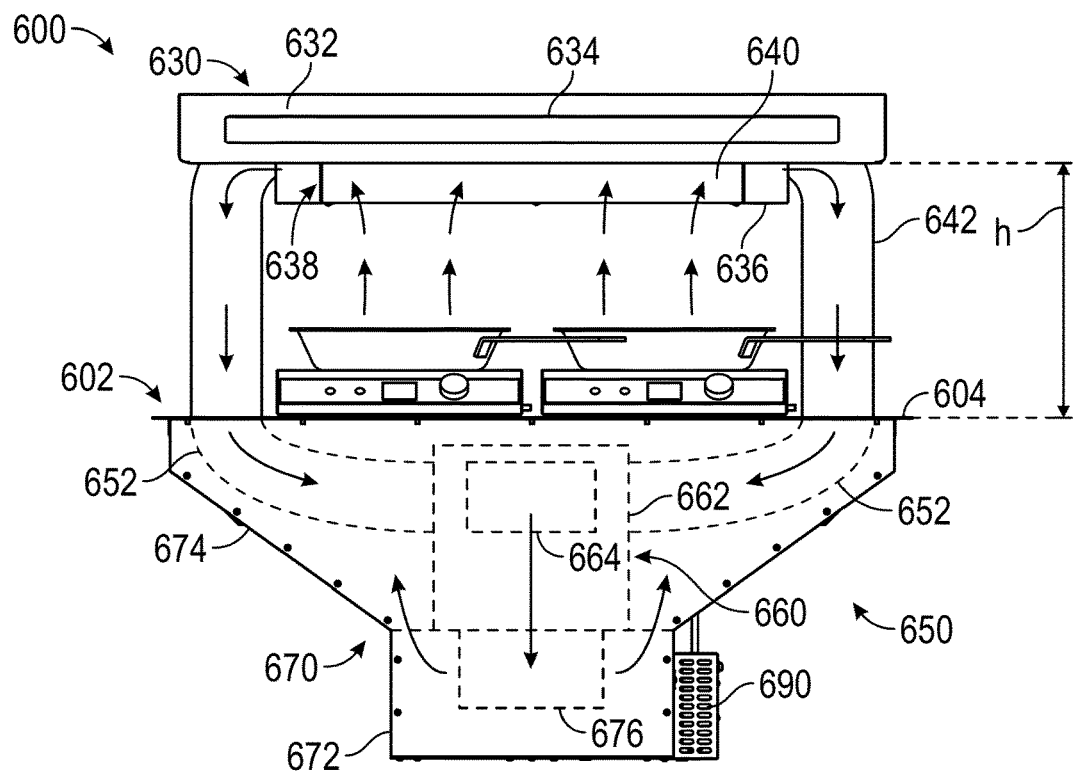
FIG. 26 is a front view of the cooking unit of FIG. 24 according to an exemplary embodiment.

As shown in FIGS. 24, 26, and 27, the cooking surface 606 is configured to support a cooking element, shown as cooking appliance 620. In some embodiments, the cooking appliance 620 is a portable cooking appliance that may be selectively removable from the cooking surface 606. The portable cooking appliance may be or include a portable gas operated grill or stove device, a portable electrically operated grill or stove device, a portable induction range, a portable panini grill/press, a portable waffle maker, a portable griddle, a portable toaster, and/or still other portable cooking appliances. In such an embodiment, a portion of the cooking unit 600 (e.g., the cooking surface 606, etc.) may include a power outlet or gas hookup to facilitate operating the portable cooking appliance. In some embodiments, the cooking appliance 620 is integrated into the cooking surface 606. By way of example, the cooking appliance 620 may be or include a gas cooktop, an electric cooktop, an induction cooktop, a gas grill, a hibachi grill, and/or still other cooking appliances that can be integrated into the cooking surface 606.

In some embodiments, the cooktop 602 is integrated into a fixed surface or structure. By way of example, the cooktop 602 may be integrated into a cabinet, a counter, and/or the like. In some embodiments, the cooktop 602 is integrated into a portable structure. By way of example, the cooktop 602 may be integrated into a portable cart. In some embodiments, the cooking unit 600 is integrated into a standalone unit.

As shown in FIGS. 24-27, the hood assembly 630 includes a top portion, shown as hood 632; a plurality of transparent panels, shown as windows 634, disposed within and along the hood 632, a compartment, shown as hood chamber 636, coupled to an underside along a central plane the hood 632; and a plurality of supports, shown as hood supports 642, having first ends coupled to the hood chamber 636 and second ends coupled to the cooktop 602 by a plurality of flanges, shown as flanges 646, thereby supporting the hood 6432 above the cooking surface 606. While the hood assembly 630 is shown to include two hood supports 642, in other embodiments, the hood assembly 630 includes one hood support 642 or three or more hood supports 642 (e.g., three, four, etc. hood supports 642). According to the exemplary embodiment shown in FIGS. 24-27, the cooktop 602 is accessible from both sides of the cooking unit 600. In other embodiments, the hood assembly 630 includes a back wall or back splash that extends from the cooktop 602 up to the hood 632 along one side of the cooktop 602 such that the cooktop 602 is accessible from only one side of the cooking unit 600. In still other embodiments, the hood supports 642 are coupled to the corners of the hood 632 such that the cooktop 602 is accessible from all sides thereof.

As shown in FIG. 26, the hood chamber 636 has one or more surfaces (e.g., a front surface, a rear surface, etc.) that defines a plurality of apertures or slots (e.g., inlets, intakes, outlets, etc.), shown as hood vents 638, and the hood assembly 630 includes one or more filters, shown as grease filters 640, disposed along, over, and/or within the hood vents 638. In some embodiments, the surface of the hood chamber 636 that defines the hood vents 638 is angled such that the grease filters 640 are angled/sloped.

According to an exemplary embodiment, the hood 632 and the hood chamber 636 are position above the cooktop 602 such that the hood chamber 636 receives smoke, steam, air, grease laden vapors, hydrocarbons, and/or other gases that may be generated during use of the cooking appliance 620 through the hood vents 638. In one embodiment, the hood 632 is manufactured from a metallic material (e.g., stainless steel, etc.) and the windows 634 are manufactured from a transparent material (e.g., glass, polycarbonates, etc.). In another embodiment, the hood 632 is manufactured from a transparent material. A transparent hood and/or a hood having transparent portions (i.e., the windows 634) may facilitate positioning the hood 632 closer to the cooktop 602 without substantially obstructing the view of the operator using the cooking appliance 620.

As shown in FIGS. 26 and 27, the hood 632 is elevated a height h above the cooktop 602 by the hood supports 642. In one embodiment, the length of the hood supports 642 is not adjustable such that the height h of the hood 632 is fixed relative to the cooktop 602. In some embodiments, the height h is selected based on the angle of the longitudinal walls 608. In other embodiments, the length of the hood supports 642 is selectively adjustable (e.g., extendable, retractable, telescopic, etc.) such that the height h of the hood 632 is variable relative to the cooktop 602.

As shown in FIGS. 24, 26, and 27, the ducting 650 includes first ducts, show as connecting ducts 652, coupled to the hood supports 642 and extending downward from an underside of the cooktop 602 and curving toward a central, vertical plane of the cooking unit 600; a second duct, shown as filtration duct 660, positioned along the central, vertical plane and coupled to the connecting ducts 652; and a third duct, shown as fan duct 670, coupled to the filtration duct 660 and the cooktop vents 612 of the cooktop 602.

As shown in FIGS. 26 and 27, the filtration duct 660 includes a housing, shown filtration system housing 662. As shown in FIGS. 26 and 27, the cooking unit 600 includes a filtering system, shown as filtration system 664, disposed within the filtration system housing 662. The filtration system 664 may be substantially similar to the filtration system 478. According to an exemplary embodiment, the filtration system 664 is configured to neutralize particulates, odors, hydrocarbons, grease laden vapors, etc. as air is cycled therethrough.

As shown in FIGS. 24, 26, and 27, the fan duct 670 includes (i) a housing, shown as fan housing 672, coupled to the filtration system housing 662 and (ii) a plurality of extensions, shown as diffusers 674, extending from the front and back of the fan housing 672 and interfacing with the underside of the longitudinal walls 608. In some embodiments, the diffusers 674 additionally or alternatively extend from the right and/or left sides of the fan housing 672 to interface with the underside of the lateral walls 610 (e.g., in embodiments where the lateral walls 610 define the cooktop vents 612, etc.). As shown in FIGS. 24 and 26, the diffusers 674 have a first end coupled to the fan housing 672 that has a first width and a second end coupled to the underside of the cooktop 602 that has a second width that is larger than the first width. Accordingly, the diffusers 674 have a tapered or angled profile.

As shown in FIGS. 26 and 27, the cooking unit 600 includes an air driver, shown as fan 676, disposed within the fan housing 672. According to the exemplary embodiment shown in FIGS. 26 and 27, the fan 676 is configured to (i) drive contaminated air (e.g., air containing hydrocarbons, grease laden vapors, smoke, odor, etc.) (a) into the hood vents 638 of the hood chamber 636 through the grease filters 640, (b) through the hood chamber 636 of into the hood support 642, (c) through the hood supports 642 into the connecting ducts 652, (d) through the connecting ducts 652 into the filtration system housing 662, and (e) through the filtration system 664 to clean the contaminated air and (ii) drive the clean air (a) into the fan housing 672, (b) through the diffusers 674, and (c) out of the cooktop vents 612 of the cooktop 602. According to an exemplary embodiment, at least a portion of the clean air exiting the cooktop vents 612 of the cooktop 602 (e.g., at least 75%, etc.) returns to the hood vents 638 of the hood chamber 636 such that an air curtain is generated between the cooktop vents 612 of the cooktop 602 and the hood vents 638 of the hood chamber 636.

In other embodiments, the fan 676 is configured to drive the contaminated air through the hood assembly 630 and the ducting 650 in the opposite direction. In such embodiments, the fan 676 is configured to circulate the air such that the air curtain is provided from the hood vents 468 of the hood chamber 636 down to the cooktop vents 612 of the cooktop 602, rather than from the cooktop vents 612 of the cooktop 602 up to the hood vents 638 of the hood chamber 636. In such embodiments, the grease filters 640 may be disposed along, over, and/or within the cooktop vents 612 of the cooktop 602 and/or the fan 676 may be repositioned into a location after the filtration system 664 (e.g., within the hood assembly 630, the position of the fan 676 and the filtration system 664 are flipped, etc.).

As shown in FIGS. 24, 26, and 27, the cooking unit 600 includes a power source, shown as power source 690. In one embodiment, the power source 690 is an electrical connector (e.g., a power cord, etc.) that facilitates connecting the cooking unit 600 to a mains power source (e.g., an electrical grid via an electrical outlet, etc.). In some embodiments, the power source 690 additionally or alternatively includes an on-board power storage and/or supply device (e.g., a battery, a solar panel, a solar generator, a combustion generator, etc.) that facilitates generating, storing, and/or providing power to electrical components of the cooking unit 600 to facilitate operating the cooking unit 600 when not near an external power source (e.g., the cooking unit 600 may therefore be a mobile unit, etc.). The power source 690 may be rechargeable and/or interchangeable. In some embodiments, the power source 690 additionally or alternatively includes a gas storage tank that facilitates operating a gas operated appliance. In some embodiments, the power source 690 additionally or alternatively includes a gas connector that facilitates connecting the cooking unit 600 to an external gas supply to facilitate operating a gas operated appliance. In some embodiments, the control system 500 is integrated into the cooking unit 600.

Figure 28:
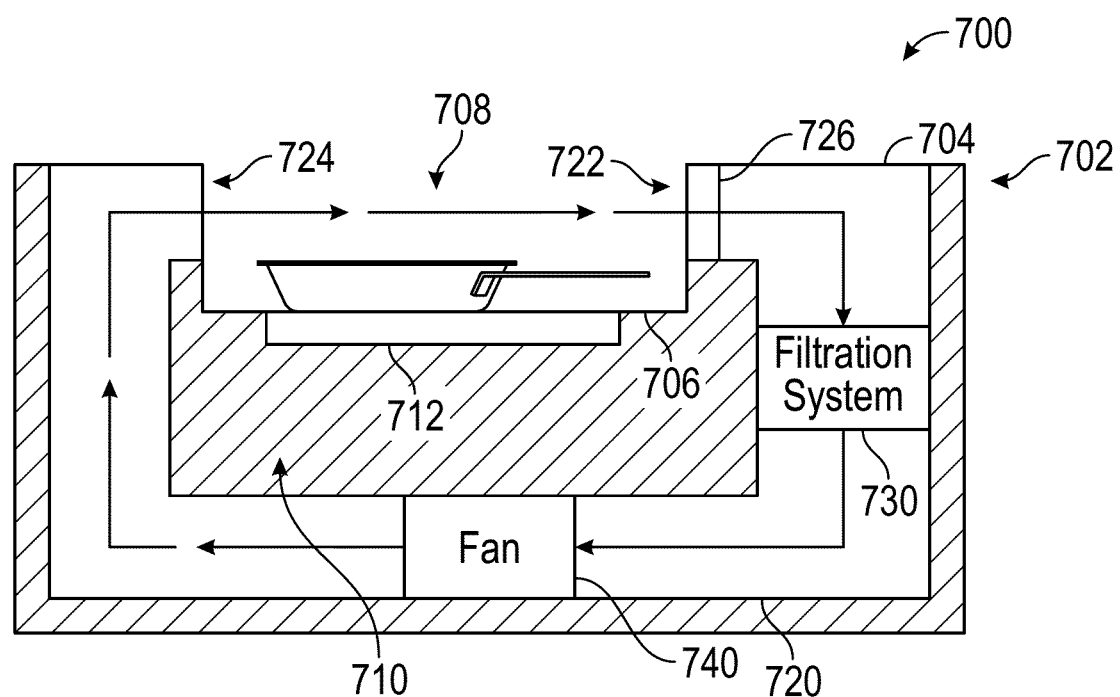
FIG. 28 is a cross-sectional view of a cooking unit, according to yet another exemplary embodiment.

According to the exemplary embodiment shown in FIG. 28, a cooking unit, shown as cooking unit 700, includes a body, shown as housing 702, a thermal element, shown as heating element 712, a duct assembly, shown as ducting 720, a filtering system, shown as filtration system 730, and an air driver, shown as fan 740. In some embodiments, the control system 500 is integrated into the cooking unit 700. As shown in FIG. 28, the housing 702 has a first surface, shown as elevated surface 704, and a second surface, shown as cooking surface 706, positioned beneath the elevated surface 704. The elevated surface 704 and the cooking surface 706 thereby define a cooking cavity, shown as recess 708, configured to receive a cooking vessel (e.g., a pan, a pot, a skillet, etc.). In some embodiments, the elevated surfaces 704 are positioned on the right and left sides of the cooking surface 706 such that the front and the rear sides of the recess 708 are open. In some embodiments, the elevated surfaces 704 are positioned on the right, left, and rear sides of the cooking surface 706 such that the front side of the recess 708 is open. In some embodiments, the elevated surfaces 704 are positioned on the front and rear sides of the cooking surface 706 such that the right and the left sides of the recess 708 are open. In some embodiments, the elevated surfaces 704 are positioned entirely around the recess 708.

As shown in FIG. 28, the housing 702 defines an interior, shown as interior chamber 710, that receives the heating element 712, the ducting 720, the filtration system 730, and the fan 740. In other embodiments, the heating element 712 is positioned along the top of the cooking surface 706. In still other embodiments, the heating element 712 is a portable appliance. According to an exemplary embodiment, the heating element 712 is positioned to facilitate cooking food product within a vessel disposed along the cooking surface 706. In some embodiments, the heating element 712 is or includes an induction heating element (e.g., an induction coil, etc.). In some embodiments, the heating element 712 is or includes a gas operated heating element (e.g., a gas burner, etc.) In some embodiments, the heating element 712 is or includes a resistive heating element (e.g., a resistive heating coil, etc.).

As shown in FIG. 28, the ducting 720 includes (i) a first opening, shown as inlet 722, disposed along an interior wall of one of the elevated surfaces 704 that defines the recess 708 and (ii) a second opening, shown as outlet 724, disposed along an interior wall of another one of the elevated surfaces 704 that defines the recess 708 and that is opposite the inlet 722. The cooking unit 700 further includes a filter, shown as grease filter 726, disposed along, over, or within the inlet 722 of the ducting 720. In some embodiments, the grease filter 726 is oriented at an angle. As shown in FIG. 28, the filtration system 730 and the fan 740 are disposed within the ducting 720 with the filtration system 730 positioned upstream of the fan 740. The filtration system 730 and the fan 740 may be similar to the filtration system 478 and the fan 490 disclosed herein.

According to an exemplary embodiment, the fan 740 is configured to (i) drive contaminated air (e.g., air containing hydrocarbons, grease laden vapors, smoke, odor, etc.) into the inlet 722, through the grease filter 726, into the ducting 720, and through the filtration system 730 to clean the contaminated air and (ii) drive clean air out of the outlet 724. According to an exemplary embodiment, at least a portion of the clean air exiting the outlet 724 returns to the inlet 722 such that an air curtain is generated between the outlet 724 and the inlet 722 and over the recess 708.

While the cooking unit 10, the cooking unit 400, the cooking unit 600, and the cooking unit 700 have mainly been described herein in the food preparation context, it should be understood that air circulation and cleaning capabilities thereof can be applied to other uses. By way of example, the units may be used in laboratories as a lab bench/table with a built-in fume hoods. By way of another example, the units may be used in workshops as a welding table with a built-in fume hood. In such an implementations, the units may not include the heating/cooking elements or appliances.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the cooking unit 10, the cooking unit 400, the cooking unit 600, and the cooking unit 700 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A cooking unit comprising:
  a cooktop defining a slot at least partially extending along a peripheral edge of the cooktop;
  a hood assembly coupled to the cooktop, the hood assembly including:
    a hood support extending upward from the cooktop, the hood support defining a conduit; and
    a hood coupled to the hood support, the hood defining an intake and a hood chamber connecting the intake to the conduit of the hood support;
  a duct assembly coupled to the cooktop, the duct assembly including a ducting extending beneath the cooktop and a door coupled to the ducting, the ducting connecting the conduit of the hood support to the slot of the cooktop;
  a fan disposed within the ducting beneath the cooktop, the fan positioned to drive air into the intake of the hood, through the hood chamber of the hood, through the conduit of the hood support, through the ducting, and out of the slot of the cooktop, wherein at least a portion of the air exiting the slot of the cooktop returns to the intake of the hood such that an air curtain is generated between the slot of the cooktop and the intake of the hood;
  a filtration system disposed within the ducting and positioned upstream of the fan, wherein the filtration sys- tem is configured to neutralize at least one of particulates, odors, hydrocarbons, or grease laden vapors within the air, wherein the door facilitates selectively accessing the filtration system;

a door sensor positioned to facilitate detecting a position of the door; and a controller configured to at least one of (i) provide an error notification or (ii) prevent operation of the cooking unit in response to the door being open.

2. The cooking unit of claim 1, wherein the peripheral edge includes a first longitudinal edge, a second longitudinal edge, a first lateral edge connecting first ends of the first longitudinal edge and the second longitudinal edge, and a second lateral edge connecting second ends of the first longitudinal edge and the second longitudinal edge, and wherein the slot at least partially extends along at least one of (i) the first longitudinal edge and the second longitudinal edge or (ii) the first lateral edge and the second lateral edge.

3. The cooking unit of claim 1, wherein the cooktop includes a cooking surface, and wherein the cooking surface is recessed relative to the peripheral edge of the cooktop.

4. The cooking unit of claim 3, wherein the cooktop includes an angled wall extending between the cooking surface and the peripheral edge, and wherein the angled wall defines the slot.

5. The cooking unit of claim 1, wherein the filtration system includes a catalytic converter and a heater positioned to facilitate selectively heating the catalytic converter.

6. The cooking unit of claim 1, wherein the filtration system includes a catalytic converter having a housing and a catalytic substrate disposed within the housing, and wherein the catalytic substrate functions as a resistive heating element when provided an electrical current.

7. The cooking unit of claim 1, wherein the filtration system includes a plurality of filters.

8. The cooking unit of claim 1, wherein the hood assembly includes a grease filter disposed along the intake of the hood.

9. The cooking unit of claim 1, wherein the cooktop includes or supports a cooking appliance, the cooking appliance including at least one of an induction heating appliance, an electrically operated heating appliance, or a gas operated heating appliance.

10. A cooking unit comprising:

a cooktop defining a slot at least partially extending along a peripheral edge of the cooktop;

a hood assembly coupled to the cooktop, the hood assembly including:

a hood support extending upward from the cooktop, the hood support defining a conduit; and a hood coupled to the hood support, the hood defining an intake and a hood chamber connecting the intake to the conduit of the hood support;

a duct assembly coupled to the cooktop, the duct assembly including a ducting extending beneath the cooktop, the ducting connecting the conduit of the hood support to the slot of the cooktop;

a fan disposed within the ducting beneath the cooktop, the fan positioned to drive air into the intake of the hood, through the hood chamber of the hood, through the conduit of the hood support, through the ducting, and out of the slot of the cooktop, wherein at least a portion of the air exiting the slot of the cooktop returns to the intake of the hood such that an air curtain is generated between the slot of the cooktop and the intake of the hood; and a filtration system disposed within the ducting and positioned upstream of the fan, wherein the filtration system is configured to neutralize at least one of particulates, odors, hydrocarbons, or grease laden vapors within the air, wherein the filtration system includes a biocatalyst that facilitates performing electrostatic enzymatic catalysis.

11. A cooking unit comprising:

a cooktop defining a slot at least partially extending along a peripheral edge of the cooktop;

a hood assembly coupled to the cooktop, the hood assembly including:

a hood support extending upward from the cooktop, the hood support defining a conduit; and a hood coupled to the hood support, the hood defining an intake and a hood chamber connecting the intake to the conduit of the hood support;

a duct assembly coupled to the cooktop, the duct assembly including a ducting extending beneath the cooktop, the ducting connecting the conduit of the hood support to the slot of the cooktop;

a fan disposed within the ducting beneath the cooktop, the fan positioned to drive air into the intake of the hood, through the hood chamber of the hood, through the conduit of the hood support, through the ducting, and out of the slot of the cooktop, wherein at least a portion of the air exiting the slot of the cooktop returns to the intake of the hood such that an air curtain is generated between the slot of the cooktop and the intake of the hood;

a filtration system disposed within the ducting and positioned upstream of the fan, wherein the filtration system is configured to neutralize at least one of particulates, odors, hydrocarbons, or grease laden vapors within the air;

an airflow sensor positioned to facilitate detecting a flow rate of the air through at least one of the hood assembly or the ducting; and a controller configured to at least one of (i) provide an error notification or (ii) prevent operation of the cooking unit in response to the flow rate of the air being at least one of (a) greater than a first threshold indicating that a component of the filtration system is not installed or (b) less than a second threshold indicating at least one of a leak, blockage in a grease filter of the hood assembly, or blockage in the filtration system.

\* \* \* \* \*